US009554388B2

United States Patent
Li et al.

(10) Patent No.: US 9,554,388 B2
(45) Date of Patent: Jan. 24, 2017

(54) METHOD AND APPARATUS OF RESOURCE SHARING FOR DEVICE-TO-DEVICE AND CELLULAR COMMUNICATIONS

(71) Applicant: NEC (CHINA) CO., LTD., Beijing (CN)

(72) Inventors: Chaofeng Li, Beijing (CN); Ming Lei, Beijing (CN); Jiaheng Wang, Nanjing (CN); Daohua Zhu, Nanjing (CN); Chunming Zhao, Nanjing (CN); Zhi Ding, Nanjing (CN)

(73) Assignee: NEC (China) Co., Ltd., Beijing (CN)

( * ) Notice: Subject to any disclaimer, the term of this patent is extended or adjusted under 35 U.S.C. 154(b) by 0 days.

(21) Appl. No.: 14/758,272

(22) PCT Filed: Dec. 31, 2012

(86) PCT No.: PCT/CN2012/088036
§ 371 (c)(1),
(2) Date: Jun. 29, 2015

(87) PCT Pub. No.: WO2014/101179
PCT Pub. Date: Jul. 3, 2014

(65) Prior Publication Data
US 2015/0351089 A1     Dec. 3, 2015

(51) Int. Cl.
*H04W 72/04*     (2009.01)
*H04W 72/08*     (2009.01)
(Continued)

(52) U.S. Cl.
CPC ......... *H04W 72/048* (2013.01); *H04W 52/265* (2013.01); *H04W 52/267* (2013.01);
(Continued)

(58) Field of Classification Search
CPC ............ H04W 72/048; H04W 72/085; H04W 52/265; H04W 52/267
(Continued)

(56) References Cited

U.S. PATENT DOCUMENTS

| 2009/0325625 | A1* | 12/2009 | Hugl | ............ H04W 52/16 |
| | | | | 455/522 |
| 2010/0261469 | A1* | 10/2010 | Ribeiro | .......... H04W 99/00 |
| | | | | 455/423 |

(Continued)

FOREIGN PATENT DOCUMENTS

| CN | 102088736 A | 6/2011 |
| JP | 2008-148299 A | 6/2008 |

(Continued)

OTHER PUBLICATIONS

International Search Report for PCT/CN2012/088036 dated Oct. 17, 2013.
(Continued)

*Primary Examiner* — Cong Tran
(74) *Attorney, Agent, or Firm* — Sughrue Mion, PLLC

(57) ABSTRACT

The present disclosure provides a method and an apparatus of resource sharing for D2D and cellular communications. The method may comprise: determining a cellular user set containing potential cellular users that may share resources with a D2D pair; and determining transmit power of the D2D pair on a frequency band of at least one cellular user in the cellular user set and transmit power of the at least one cellular user through maximizing throughput of the D2D pair with a quality of service (QoS) constraint and a power budget constraint of each of the potential cellular users and a transmit power constraint of the D2D pair. With embodiments of the present disclosure, it may provide a non-orthogonal resource sharing solution in which a D2D pair can reuse resources of the cellular users as more as possible (Continued)

while the QoS of all the cellular users are guaranteed, whereby the performance of the D2D user may be improved greatly.

20 Claims, 7 Drawing Sheets

(51) Int. Cl.
  *H04W 52/26* (2009.01)
  *H04W 52/34* (2009.01)
  *H04W 52/38* (2009.01)
  *H04W 88/06* (2009.01)

(52) U.S. Cl.
  CPC ....... *H04W 52/346* (2013.01); *H04W 52/383* (2013.01); *H04W 72/082* (2013.01); *H04W 72/085* (2013.01); *H04W 88/06* (2013.01)

(58) Field of Classification Search
  USPC .......................................... 455/426.1, 552.1
  See application file for complete search history.

(56) References Cited

U.S. PATENT DOCUMENTS

| | | |
|---|---|---|
| 2011/0306349 A1 | 12/2011 | Hakola et al. |
| 2012/0099540 A1* | 4/2012 | Doppler ............... H04J 11/0033 370/329 |
| 2012/0195216 A1 | 8/2012 | Wu et al. |

FOREIGN PATENT DOCUMENTS

| | | |
|---|---|---|
| WO | 2011/157884 A1 | 12/2011 |
| WO | 2012/159270 A1 | 11/2012 |

OTHER PUBLICATIONS

Written Opinion for PCT/CN2012/088036 dated Oct. 17, 2013.
Communication dated Mar. 22, 2016 from the Japanese Patent Office in counterpart application No. 2015-549934.
Fujitsu, "On Power Consumption of Low Cost MTC Devices," 3GPP TSG RAN WG1 #68, R1-120765, Dresden, Germany, Feb. 6-10, 2012 (2 pages total).
Peng et al., "Optimal Resource Allocation for multi-D2D links Underlying OFDMA-based Communications," Wireless Signal Processing and Network Lab, Key laboratory of Universal Wireless Communication Ministry of Education, Beijing University of Posts & Telecommunication, Sep. 21-23, 2012 IEEE (5 pages total).
Zhu et al., "QoS-based Resource Allocation Scheme for Device-to-Device (D2D) Radio Underlaying Cellular Networks," 19th International Conference on Telecommunications (1CT 2012), Apr. 23-25, 2012, 7 pages total.
Liu et al., "Distributed Cooperative Admission and Power Control for Device-to-Device Links with QoS Protection in Cognitive Heterogeneous Network," 2012 7th International ICST Conference on Communication and Networking in China (CHINACOM), Aug. 8-10, 2012, 7 pages total.
Yu et al., "Resource Sharing Optimization for Device-to-Device Communication Underlaying Cellular Networks," IEEE Transactions on Wireless Communications, vol. 10, No. 8, Aug. 2011 (14 pages total).

* cited by examiner

METHOD AND APPARATUS OF RESOURCE SHARING FOR DEVICE-TO-DEVICE AND CELLULAR COMMUNICATIONS

CROSS REFERENCE TO RELATED APPLICATIONS

This application is a National Stage of International Application No. PCT/CN2012/088036 filed Dec. 31, 2012, the contents of which are incorporated herein by reference in their entirety.

FIELD OF THE INVENTION

Embodiments of the present disclosure generally relate to a field of wireless communication technology, and more particularly, to a method and apparatus of resource sharing for device-to-device and cellular communications.

BACKGROUND OF THE INVENTION

Nowadays, the demand of high-speed data services on wireless bandwidth grows constantly, which has promoted various new technologies to be developed. For example, Device-to-Device (D2D) communication has been proposed to be an underlay to a cellular network so as to improve spectrum efficiency and system sum rate. The D2D communication is a new type of technology that allows user equipments (UEs) to communicate with each other through a direct connection instead of being relayed by a base station, and it is expected to become a key feature to be supported by next generation cellular networks. In the D2D communication, the D2D UEs could share same subcarrier resources with the conventional cellular UEs while the setup process will be still controlled by the network. In such way, it may provide a higher date rate, may cost less power consumption, and may lead to efficient resource (such as spectrum) utilization.

As an underlay to cellular systems, the D2D communication may share resources with cellular users in an either orthogonal or in a non-orthogonal manner. In an orthogonal sharing scheme, dedicated resources are allocated to D2D users. This scheme is easy to implement but can not fully exploit the potential of D2D communication to improve spectral efficiency of cellular systems. Just for this reason, the non-orthogonal sharing scheme has been also received much attention. In the non-orthogonal sharing scheme, the same resources are shared by the cellular users and the D2D users. However, due to resource sharing, it may cause undesirable interference to the cellular network users. Particularly, during the downlink (DL) transmission, conventional cellular users may suffer from interference by a D2D transmitter, and on the other hand, during the uplink (UL) transmission, a base station (BS) may be a victim of interference by the D2D transmitter. Therefore, in order to ensure that D2D communication is utilized efficiently, it usually requires employing appropriate resource sharing schemes with effective interference management.

Amongst others, optimizing resource sharing of the D2D communication underlaying cellular systems is an intensively scrutinized subject. For example, in paper "Resource sharing optimization for device-to-device communication underlaying cellular networks," (C.-H. Yu, K. Doppler, C. B. Ribeiro, and O. Tirkkonen, IEEE Trans. Wireless Commun., vol. 10, no. 8, pp. 2752-2763, August 2011), there is disclosed a resource sharing optimization scheme. According to the scheme proposed in this paper, there are three resource allocation modes, i.e., a non-orthogonal sharing mode, an orthogonal sharing mode and a cellular mode. In the non-orthogonal sharing mode, D2D users and cellular users reuse the same resources, which may cause interferences to each other; in the orthogonal sharing mode, the D2D users are allocated part of the resources and the remaining part of resources is left to the cellular user for signal transmission; and in the cellular mode, the D2D users conventionally communicate with each other through the BS that acts as a relay node. In the proposed scheme, the transmission in all of these modes is optimized and resource sharing may be applied in either UL transmission or DL transmission, and the resource sharing scheme between one D2D pair and single cellular UE is proposed to optimize sum rate, while different constraints are taken into account.

However, the solution as disclosed in the paper only addresses an elementary problem in principle and it can not be used in real applications. In practice, there are still a lot of problems to be addressed. Therefore, in the art, there is a need for a new technical solution for resource sharing for D2D and cellular communications.

SUMMARY OF THE INVENTION

In view of the foregoing, the present disclosure provides a new solution for resource sharing between D2D and cellular communications so as to solve or at least partially mitigate at least a part of problems in the prior art.

According to a first aspect of the present disclosure, there is provided a method of resource sharing for D2D and cellular communications. The method may comprise: determining a cellular user set containing potential cellular users that may share resources with a D2D pair; and determining transmit power of the D2D pair on a frequency band of at least one cellular user in the cellular user set and transmit power of the at least one cellular user through maximizing throughput of the D2D pair with a quality of service (QoS) constraint and a power budget constraint of each of the potential cellular users and a transmit power constraint of the D2D pair.

In an embodiment of the present disclosure, the determining the cellular user set may comprise: for each of scheduled cellular users, performing a feasibility checking to find cellular users whose QoS can be guaranteed without resource sharing.

In another embodiment of the present disclosure, the performing a feasibility checking may comprise: determining whether power budget of each of the scheduled cellular users satisfy: $2^{\rho_i}-1 \leq \alpha_i P_i$, wherein $\rho_i$ is a QoS threshold of cellular user i, $\alpha_i$ denotes normalized channel gain from the cellular user i to a base station; and $P_i$ is power budget of the cellular user i.

In a further embodiment of the present disclosure, in a case that a sum of tolerant interference power levels of all potential cellular users contained in the cellular user set is lower than or equal to power budget of the D2D pair, the transmit power of the D2D pair on the frequency band of the at least one cellular user i and the transmit power of the at least one cellular user i may be determined as $$q_i^* = D_i \text{ and } p_i^* = \frac{\omega_i}{\alpha_i}(1+\theta_i D_i),$$

wherein $D_i = \min\{Q_i, (\alpha_i P_i - \omega_i)/\omega_i \theta_i\}$; $\omega_i = 2^{\rho_i}-1$; $Q_i$ is a limit on transmit power of the D2D pair on frequency band of cellular user i; $\alpha_i$ denotes normalized channel gain from the cellular user i to a base station; $\theta_i$ denotes normalized channel gain from the D2D transmitter to the base station on frequency band of the cellular user i; $\rho_i$ is QoS threshold of the cellular user i; and $P_i$ is power budget of the cellular user i.

In a still further embodiment of the present disclosure, optimal transmit power $p_i^*$ of the potential cellular users may meet:

$$p_i^* = \frac{\omega_i}{\alpha_i}(1 + \theta_i q_i),$$
$$\omega_i = 2^{\rho_i} - 1,$$

wherein $\rho_i$ is a QoS threshold of cellular user i, $\alpha_i$ denotes normalized channel gain from the cellular user i to a base station; $\theta_i$ denotes normalized channel gain from the D2D transmitter to the base station on frequency band of the cellular user i, and $q_i$ is the transmit power of the D2D transmitter on the frequency band of the cellular user i.

In a yet further embodiment of the present disclosure, optimal transmit power $q_i^*$ of the D2D pair on frequency band of the potential cellular user i meet: $\Sigma_{i=1}^{N} q_i^* = Q$, wherein Q denotes power budget of the D2D pair.

In a still yet further embodiment of the present disclosure, in a case that a sum of tolerant interference power levels of all potential cellular users contained in the cellular user set is higher than power budget of the D2D pair, the transmit power of the D2D pair on the frequency band of the at least one cellular user and the transmit power of the at least one cellular user may be determined as $$q_i^* = \left[\frac{\sqrt{B_i^2 - 4A_iC_i(\lambda)} - B_i}{2A_i}\right]_0^{D_i}, \text{ and } p_i^* = \frac{\omega_i}{\alpha_i}(1 + \theta_i q_i^*)$$

wherein $[.]_0^{D_i}$ represents the projection onto an interval [0, $D_i$];

$A_i = \omega_i\beta_i\theta_i(\alpha_i\gamma_i + \omega_i\beta_i\theta_i);$ $B_i = (\alpha_i + \omega_i\beta_i)(2\omega_i\beta_i\theta_i + \alpha_i\gamma_i);$ $C_i(\lambda) = (\alpha_i + \omega_i\beta_i)\left(\alpha_i + \omega_i\beta_i - \frac{1}{\lambda}\alpha_i\gamma_i\right);$ $D_i = \min\{Q_i, (\alpha_iP_i - \omega_i)/\omega_i\theta_i\}; \omega_i = 2^{\rho_i} - 1;$ $\alpha_i$ denotes normalized channel gain from the cellular user i to a base station; $\beta_i$ denotes normalized channel gain from the cellular user i to the D2D receiver; $\gamma_i$ denotes normalized channel gain from the D2D transmitter to the D2D receiver on frequency band of the cellular user i; $\theta_i$ denotes normalized channel gain from the D2D transmitter to the base station on frequency band of the cellular user i; $\rho_i$ is a QoS threshold of the cellular user i; $\lambda$ is a Lagrange multiplier; $Q_i$ is a limit on transmit power of the D2D pair on frequency band of cellular user i; and $P_i$ is power budget of cellular user i.

In another embodiment of the present disclosure, transmit power of each of the potential cellular users may be determined as a fixed value. For example, the fixed power may be power budget of each of the potential cellular users. In such as case, the transmit power $q_i^*$ of the D2D pair on frequency band of at least one cellular user i is determined as:

$$q_i^* = \left[\mu - \frac{1 + \beta_iP_i}{\gamma_i}\right]_0^{D_i}$$

wherein $\mu$ denotes a water level value; $[.]_0^{D_i}$ represents the projection onto an interval [0, $D_i$]; $D_i = \min\{Q_i, (\alpha_iP_i - \omega_i)/\omega_i\theta_i\}$ and $\omega_i = 2^{\rho_i} - 1$; $\alpha_i$ denotes normalized channel gain from cellular user i to a base station; $\beta_i$ denotes normalized channel gain from the cellular user i to the D2D receiver; $\gamma_i$ denotes normalized channel gain from the D2D transmitter to the D2D receiver on frequency band of the cellular user i; $\theta_i$ denotes normalized channel gain from the D2D transmitter to a base station; $P_i$ is power budget of cellular user i; $\rho_i$ is a QoS threshold of cellular user i; and $Q_i$ is a limit on transmit power of the D2D pair on frequency band of the cellular user i.

In a further embodiment of the present disclosure, a fixed number of cellular users may be selected from the cellular user set for resource sharing with the D2D pair. For example, it may allow the D2D pair share resource with only one cellular user. In such a case, the transmit power $q^*$ of the D2D pair on frequency band of cellular user n which is selected for resource sharing with the D2D pair and the transmit power $p^*$ of the cellular user n may be determined respectively as:

$$q^* = D_n, p^* = \frac{\omega_n}{\alpha_n}(1 + \theta_nD_n)$$

wherein $n = \underset{i}{\mathrm{argmax}}S_i$, $$S_i = \log\left(1 + \frac{\alpha_i\gamma_iD_i}{\alpha_i + \omega_i\beta_i + \omega_i\beta_i\theta_iq_i}\right), \omega_i = 2^{\rho_i} - 1$$

$D_i = \min\{Q, (\alpha_iP_i - \omega_i)/\omega_i\theta_i\}$ and $\omega_i = 2^{\rho_i} - 1$, wherein $\alpha_i$ denotes normalized channel gain from the cellular user i to a base station; $\beta_i$ denotes normalized channel gain from the cellular user i to the D2D receiver; $\gamma_i$ denotes normalized channel gain from the D2D transmitter to the D2D receiver on frequency band of cellular user i; $\theta_i$ denotes normalized channel gain from the D2D transmitter to the base station on frequency band of cellular user i; $q_i$ denotes transmit power of the D2D pair on frequency band of cellular user i; $\rho_i$ is a QoS threshold of cellular user i; Q denotes power budget of the D2D pair and $P_i$ is power budget of cellular user i.

In a still further embodiment of the present invention, the method may be re-performed in response to expiring of a scheduling period.

According to a second aspect of the present disclosure, there is further provided an apparatus of resource sharing for D2D and cellular communications. The apparatus may comprise: cellular user set determination module configured to determine a cellular user set containing potential cellular users that may share resources with a D2D pair; and transmit power determination module configured to determine transmit power of the D2D pair on a frequency band of at least one cellular user in the cellular user set and transmit power of the at least one cellular user through maximizing throughput of the D2D pair with a quality of service (QoS) constraint and a power budget constraint of each of the potential cellular users and a transmit power constraint of the D2D pair.

According to a third aspect of the present disclosure, there is also provided a network node, which comprises an apparatus according to the second aspect of the present disclosure.

According to a fourth aspect of the present disclosure, there is provided a computer-readable storage media with computer program code embodied thereon, the computer program code configured to, when executed, cause an apparatus to perform actions in the method according to any one of embodiments of the first aspect.

According to a fifth aspect of the present disclosure, there is provided a computer program product comprising a computer-readable storage media according to the fourth aspect.

With embodiments of the present disclosure, it may provide a non-orthogonal resource sharing solution in which a D2D pair can reuse resources of the cellular users as more as possible while QoS of all the cellular users are guaranteed, whereby the performance of the D2D user may be improved greatly.

BRIEF DESCRIPTION OF THE DRAWINGS

The above and other features of the present disclosure will become more apparent through detailed explanation on the embodiments as illustrated in the embodiments with reference to the accompanying drawings throughout which like reference numbers represent same or similar components and wherein.

DETAILED DESCRIPTION OF EMBODIMENTS

Hereinafter, a methods and apparatuses of resource sharing for D2D and cellular communications and network nodes therefor will be described in details through embodiments with reference to the accompanying drawings. It should be appreciated that these embodiments are presented only to enable those skilled in the art to better understand and implement the present disclosure, not intended to limit the scope of the present disclosure in any manner.

It should be first noted that this disclosure is illustrated in particular sequences for performing the steps of the methods. However, these methods are not necessarily performed strictly according to the illustrated sequences, and they can be performed in reverse sequence or simultaneously based on natures of respective method steps. Beside, the indefinite article "a/an" as used herein does not exclude a plurality of such steps, units, modules, devices, and objects, and etc.

Before explaining embodiments of the present disclosure, the system model or the architecture of a system in which the present disclosure can be implemented will be firstly described with reference to FIG. 1, which schematically illustrates a system model of D2D communication underlying cellular networks in a case of uplink resource sharing.

Figure 1:
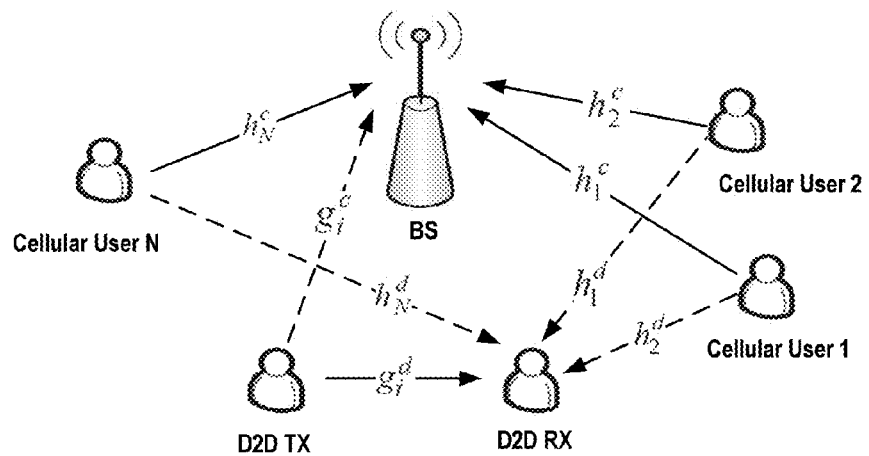
FIG. 1 schematically illustrates a system model of D2D communication underlying cellular networks in a case of uplink resource sharing.

As illustrated in FIG. 1, in the system model, there is a base station (BS) for serving for all users. Additionally, there are a plurality of traditional cellular users and a plurality of D2D users. The D2D transmitter and the D2D receiver form a D2D pair while the cellular users 1 to N are traditional cellular users. The D2D pair will share frequency bands of the traditional cellular users 1 to N. However, it should be noted that there is much more cellular users than N, and the N cellular users are those scheduled for transmission during a certain transmission interval, which are determined based on a specific criteria as described in detail hereinafter.

In the system model, all cellular users are served by the BS in an orthogonal FDMA mode, that is to say, for each cellular user, a fraction of system band will be allocated thereto for signal transmission. Besides, the session setup of D2D communication requires the traffic fulfilling a certain criterion (e.g., data rate) so that the system would consider it as the potential D2D traffic. For example, if both users in the pair are D2D capable and D2D communication offers higher throughput, the BS would set up a D2D bearer. However, the BS maintains detecting if users should be back to the cellular mode after the D2D connection setup succeeds. Further, the BS is still the control center of the radio resource for both cellular and D2D communications.

Additionally, in the system model as illustrated, the D2D transmitter will transmit data signals to the D2D receiver via a D2D link and thus it will bring interference to the BS; the cellular users 1 to N transmit signals to the BS conventionally and thus the D2D receiver will receive interferences from the cellular users 1 to N in addition to the data signals transmitted from the D2D transmitter. Moreover, the cellular users may be indexed by i, wherein i=1, . . . , N, and a frequency band of the cellular user i may be also denoted by frequency band i. The channel from the cellular user i to the BS is denoted by $h_i^c$, the channel from the cellular user i to the D2D receiver is denoted by $h_i^d$, the channel from the D2D transmitter to the D2D receiver on frequency band i is denoted by $g_i^d$ and the channel from the D2D transmitter to the BS on the frequency band i is denoted by $g_i^c$.

Hereinafter, reference will be made to FIG. 2 to describe the method of resource sharing for the D2D and cellular communications as provided in the present disclosure.

Figure 2:
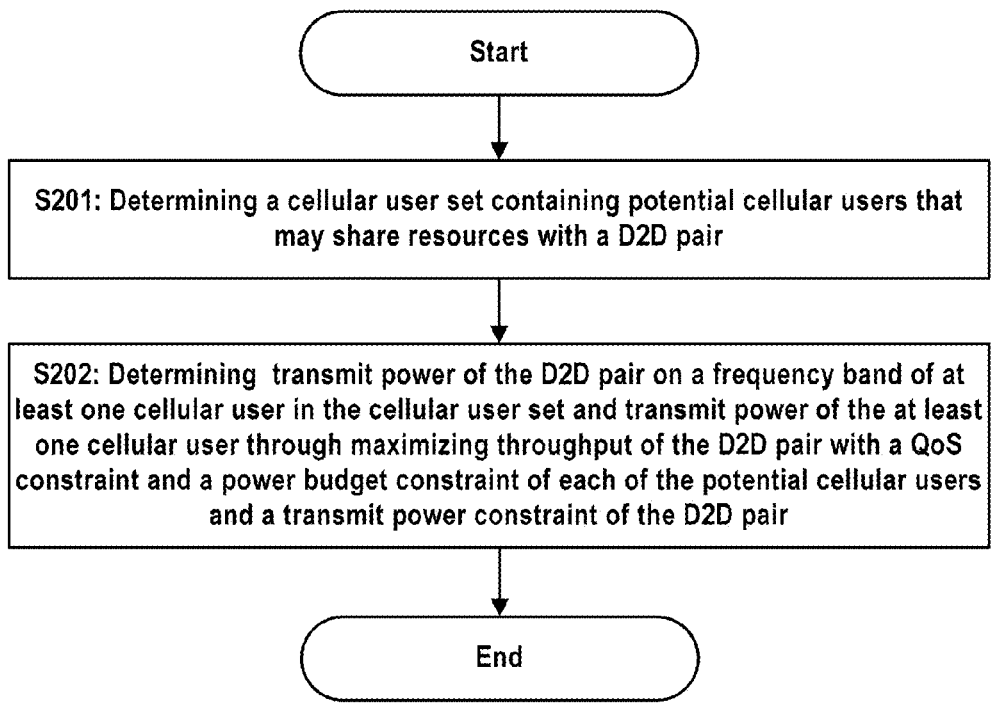
FIG. 2 schematically illustrates a flow chart of a method of resource sharing for D2D and cellular communications according to an embodiment of the present disclosure.

As illustrated in FIG. 2, first at step S201, it may determine a cellular user set that contains potential cellular users that may share resources with a D2D pair.

In the system, all cellular users are served by the BS in an orthogonal FDMA mode; that is to say, for each cellular user, a fraction of overall subcarriers will be allocated for signal transmission. At the beginning of a scheduling period, the BS may schedule physical resources for the cellular users by using a convention resource allocation algorithm without performing power allocation.

However, not all the cellular users in the cell may participate in resource sharing in the present disclosure. That is to say, only cellular users meeting a certain criteria may share its resource with a D2D pair. For example, only when a cellular user may achieve its QoS requirement with the allocated physical resources without resource sharing, it is possible for it to share its resource with a D2D pair. Therefore, in an embodiment of the present disclosure, a feasibility checking is performed for each of scheduled cellular users, to determine the cellular user set. Particularly, it may check whether a cellular user can guarantee its QoS without resource sharing to find cellular users whose QoS can be guaranteed without resource sharing and obtain the cellular user set.

In an embodiment of the present disclosure, it may determine whether power budget of each of scheduled cellular users i satisfy: $2^{\rho_i}-1 \leq \alpha_i P_i$ wherein $\rho_i$ is a QoS threshold of cellular user i, $\alpha_i$ denotes normalized channel gain from cellular user i to the base station; and $P_i$ is power budget of the cellular user i. The reason that each potential user should satisfy the above-mentioned relationship will be described latter.

At the same time, the D2D UEs, in the vicinity of each other, may inquire the BS to establish a direct connection by sending a message that the D2D transmit power is Q. If the D2D UEs meet a certain criteria, the BS will set up a D2D bearer.

After such a cellular user set has been determined, the BS serving a full-controlled functional entity may determine transmit power of the D2D pair on a frequency band of at least one cellular user in the cellular user set and transmit power of the at least one cellular user based on the acquired fading parameters and power budgets of the D2D user and the cellular users at step S202. The transmit power determination may be performed through solving an optimization problem that maximizes throughput of the D2D pair with QoS constraint and power budget constraint of each of the potential cellular users and power transmit constraint of the D2D pair. Next, detailed description will be made to the optimization problem.

In the system model as illustrated in FIG. 1, if it is assumed that a signal transmitted by the cellular user i is represented by $x_i^c$ and a signal transmitted by the D2D user on frequency band i is represented by $x_i^d$, the signal $y_i^c$ received at the BS from the cellular user i, may be expressed by $$y_i^c = h_i^c x_i^c + g_i^c x_i^d + n_i^c \quad \text{(Formula 1)}$$

and the signal $y_i^d$ received by the D2D receiver on the frequency band i, may be expressed by $$y_i^d = g_i^d x_i^d + h_i^d x_i^c + n_i^d \quad \text{(Formula 2)}$$

wherein as described hereinabove, $h_i^c$ denotes the channel from the cellular user i to the BS, $h_i^d$ denotes the channel from the cellular user i to the D2D receiver, $g_i^d$ denotes the channel from the D2D transmitter to the D2D receiver on the frequency band i; $g_i^c$ denotes the channel from the D2D transmitter to the BS on the frequency band i; $n_i^c$ denotes additive zero-mean Gaussian noise of the cellular link with a variance $\sigma_i^c$; and $n_i^d$ denotes additive zero-mean Gaussian noise of the D2D link with a variance $\sigma_i^d$.

Additionally, it is also assumed that both the cellular users and the D2D user use Gaussian codes on each frequency band i with transmit power $p_i \triangleq E|x_i^c|^2$ and $q_i \triangleq E|x_i^d|^2$, respectively. Due to coexistence of cellular and D2D users on the same frequency band, the throughput of the cellular user i and the throughput of the D2D pair on the frequency band i may be given respectively by $$R_i^c(p_i, q_i) \triangleq \log\left[1 + \frac{|h_i^c|^2 p_i}{\sigma_i^c + |g_i^c|^2 q_i}\right] = \log\left[1 + \frac{\alpha_i p_i}{1 + \theta_i q_i}\right] \quad \text{(Formula 3)}$$

$$R_i^d(p_i, q_i) \triangleq \log\left[1 + \frac{|g_i^d|^2 q_i}{\sigma_i^d + |h_i^d|^2 p_i}\right] = \log\left[1 + \frac{\gamma_i q_i}{1 + \beta_i p_i}\right] \quad \text{(Formula 4)}$$

wherein $p_i$ denotes the transmit power of the cellular user i; $q_i$ denotes the transmit power of the D2D pair on frequency band i; $\sigma_i^c$ denotes the power of additive zero-mean Gaussian noise of the cellular link; $\sigma_i^d$ denotes the power of additive zero-mean Gaussian noise of the D2D link; $\alpha_i = |h_i^c|^2/\sigma_i^c$ a denotes normalized channel gains from the cellular user i to the BS; $\beta_i = |h_i^d|^2/\sigma_i^d$ denotes normalized channel gains from the cellular user i to the D2D receiver; $\gamma_i = |g_i^d|^2/\sigma_i^d$ denotes normalized channel gains from the D2D user to the D2D receiver; $\theta_i = |g_i^c|^2/\sigma_i^c$ denotes normalized channel gains from the D2D user to the BS.

Generally, the D2D communication was introduced as an optional service of a cellular system and a cellular link may have a higher priority than a D2D link. Therefore, based on this, the inventors has proposed to design the resource sharing between the cellular and D2D users so that D2D can achieve the maximum benefit while the cellular users' requirements are always satisfied. For example, it can maximize the data rate or throughput of the D2D link with a group of QoS constraints imposed by the cellular users, by properly choosing the transmit power $p_i \triangleq \{p_i\}_1^N$ of the cellular users and the transmit power $q_i \triangleq \{q_i\}_1^N$ of the D2D user. That is to say, the transmit power $p_i \triangleq \{p_i\}_1^N$ and $q_i \triangleq \{q_i\}_1^N$ may be determined by solving the following optimization problem:

$$\max_{p,q} \sum_{i=1}^{N} R_i^d(p_i, q_i) \quad \text{(Formula 5)}$$

$$\text{subject to } R_i^c(p_i, q_i) \geq \rho_i, i = 1, \ldots, N$$

$$0 \leq p_i \leq P_i, 0 \leq q_i \leq Q_i, i = 1, \ldots, N$$

$$\sum_{i=1}^{N} q_i \leq Q$$

wherein $\rho_i$ is a QoS threshold of cellular user i, $P_i$ is power budget of the cellular user Q is power budget of the D2D user and $Q_i$ is a limit on transmit power of the D2D pair on the frequency band i.

However, it may be seen that formula 5 is a non-convex problem since both $R_i^c(p_i,q_i)$ and $R_i^d(p_i,q_i)$ are not jointly concave in $p_i$ and $q_i$. Generally, it is not easy to find an optimal solution of a non-convex optimization problem, and if a solution is found, it might also be a local optimal solution instead of a global solution. Thus it is a challenging task to find the optimal resource sharing strategy. To solve such a non-convex optimization problem, the inventors has provided a fully analytical characterization of the optimization problem, which will be described in detail in the following.

Optimal Resource Sharing Scheme

Hereinafter the optimal scheme for resource sharing will be described at length. However, before the detailed description, the necessary and sufficient condition that the problem is feasible will be found first.

From formula (5), it is known that each cellular user i should meet its respective QoS constrain, i.e., there is:

$$R_i^c(p_i, q_i) \geq \rho_i \quad \text{(Formula 6)}$$

If formula (3) is substituted into formula (6), it may obtain the following relationship expression:

$$\log\left[1 + \frac{\alpha_i p_i}{1 + \theta_i q_i}\right] \geq \rho_i \quad \text{(Formula 7)}$$

Since $0 \leq p_i \leq P_i$ and $0 \leq q_i \leq Q_i$ and thus it can obtain the following expression:

$$\log(1 + \alpha_i P_i) \geq \log\left[1 + \frac{\alpha_i p_i}{1 + \theta_i q_i}\right] \geq \rho_i \quad \text{(Formula 8)}$$

which may be further converted into:

$$\alpha_i P_i \geq 2^{\rho_i} - 1 \quad \text{(Formula 9)}$$

If $\omega_i$ is used to denote $2^{\rho_i} - 1$ for a purpose of simplicity, then the following formula can be given:

$$\omega_i = 2^{\rho_i} - 1 \leq \alpha_i P_i \quad \text{(Formula 10)}$$

It is clear that it is a necessary condition that the optimization problem is feasible.

On the other hand, if $\log(1 + \alpha_i P_i) \geq \rho_i$, then will be at least one feasible point for the optimization problem, i.e., $p_i = P_i$ and $q_i = 0$, which provides the sufficient condition of the optimization problem.

Actually, it can be seen from the above process, the necessary and sufficient condition is obtained under a condition that $q_i = 0$ and $p_i = P_i$, i.e., no D2D pair share resource with cellular user i. Therefore, the necessary and sufficient condition for the optimization problem means that the power budget for the cellular user i should at least guarantee its QoS requirement when no D2D pair shares its resource. Only if such a sufficiency and necessary condition is met, it is possible for the cellular user i to share its resources with a D2D pair. That is just the reason that the feasible check is performed based on formula (10) in step S201.

Additionally, the inventors has realized that although formula (5) is a non-convex problem in its original form, which is hard to be solved, some conversions may be made to transform it into a convex problem so that it can be analytically solved. Next, detailed description will be made to explain such conversions.

As mentioned hereinabove, for each cellular user i, there is a QoS constraint which mean it should meet the relationship as given in formula (7), based on which, it may further obtain the following relationship expression:

$$p_i \geq (2^{\rho_i} - 1)\frac{1 + \theta_i q_i}{\alpha_i} = \frac{\omega_i}{\alpha_i}(1 + \theta_i q_i) \quad \text{(Formula 11)}$$

That is to say, the QoS constraint for the cellular user as given in formula (6) is equivalent to the relational expression $$p_i \geq \frac{\omega_i}{\alpha_i}(1 + \theta_i q_i).$$

Additionally, from formula (4), it is clear that the objective function $R_i^d(p_i, q_i)$ in formula (5) is a monotonically decreasing in $p_i$ for a fixed $p_i$, which means the optimal solution may be obtained when the transmit power $p_i$ of the cellular user is equal to $$\frac{\omega_i}{\alpha_i}(1 + \theta_i q_i),$$

and thus the optimal $p_i$ may be obtained at:

$$p_i^* = \frac{\omega_i}{\alpha_i}(1 + \theta_i q_i) \quad \text{(Formula 12)}$$

If this formula (12) is substituted into the objective function $R_i^d(p_i, q_i)$, the unknown parameter $p_i$ will be eliminated, i.e., it may obtain the following formula:

$$R_i^d(p_i^*, q_i) = \log\left(1 + \frac{\alpha_i \gamma_i q_i}{\alpha_i + \omega_i \beta_i + \omega_i \beta_i \theta_i q_i}\right) \quad \text{(Formula 13)}$$

This formula is a concave function which will be proved through next operations. If it uses $h(q_i)$ to denote $$\frac{\alpha_i \gamma_i q_i}{\alpha_i + \omega_i \beta_i + \omega_i \beta_i \theta_i q_i},$$

a second derivative of $h(q_i)$ may be represent as:

$$h''(q_i) = -\frac{2\alpha_i \gamma_i \omega_i \beta_i \theta_i(\alpha_i + \omega_i \beta_i)}{(\alpha_i + \omega_i \beta_i + \omega_i \beta_i \theta_i q_i)^3} \leq 0 \quad \text{(Formula 14)}$$

It is known that the second derivative of a function being equal to or less than zero means that the function is a concave function. Therefore, $h(q_i)$ is concave. Additionally, it is also known that $\log(1+x)$ is concave and monotonically increasing, thus it is apparent that $R_i^d(p_i^*, q_i) = \log(1 + h(q_i))$ is also a concave function.

Meanwhile, since there is $$p_i \geq \frac{\omega_i}{\alpha_i}(1 + \theta_i q_i)$$

and $p_i \leq P_i$, it implies that $$\frac{\omega_i}{\alpha_i}(1 + \theta_i q_i) \leq P_i$$

or equivalently, $q_i \leq (\alpha_i P_i - \omega_i)/\omega_i \theta_i$. Thus, the power budget constraint for $q_i$ in formula (5) (i.e., $0 \leq q_i \leq Q_i$) may be in turn converted into:

$$0 \leq q_i \leq D_i \quad \text{(Formula 15)}$$

wherein $D_i = \min\{Q_i, (\alpha_i P_i - \omega_i)/\omega_i \theta_i\}$, which denotes tolerant interference power levels of the cellular users.

Consequently, the optimization problem as given in formula (5) may be simplified as the following convex problem:

$$\max_q \sum_{i=1}^N \log\left(1 + \frac{\alpha_i \gamma_i q_i}{\alpha_i + \omega_i \beta_i + \omega_i \beta_i \theta_i q_i}\right) \quad \text{(Formula 16)}$$

subject to $0 \leq q_i \leq D_i, i = 1, \ldots, N$ $$\sum_{i=1}^N q_i \leq Q$$

However, if $\sum_{i=1}^N D_i \leq Q$, i.e., the cellular users' tolerant interference power levels is relatively lower, the power constraint $\sum_{i=1}^N q_i \leq Q$ will become redundant. In such a case, the objective function in formula (5) is increasing in q, and thus the optimal solution can be simply determined as $q_i^* = D_i$ and $$p_i^* = \frac{\omega_i}{\alpha_i}(1 + \theta_i D_i).$$

On the other hand, in a case that $\sum_{i=1}^N D_i > Q$, i.e., the cellular users' tolerant interference power levels is relatively higher, the optimization problem may be shoved by the corresponding Lagrangian, which may be written as:

$$l(q, \lambda) = \sum_{i=1}^N \log\left(1 + \frac{\alpha_i \gamma_i q_i}{\alpha_i + \omega_i \beta_i + \omega_i \beta_i \theta_i q_i}\right) + \lambda\left(Q - \sum_{i=1}^N q_i\right) \quad \text{(Formula 17)}$$

wherein the Lagrange multiplier $\lambda \geq 0$ and the first-order optimality conditions are given by the nonlinear formula are given as bellows:

$$\frac{\partial l(q, \lambda)}{\partial q_i} = \frac{\alpha_i \gamma_i (\alpha_i + \omega_i \beta_i)}{(\alpha_i + \omega_i \beta_i + \omega_i \beta_i \theta_i q_i)^2 + \alpha_i \lambda_i q_i (\alpha_i + \omega_i \beta_i + \omega_i \beta_i \theta_i q_i)} - \lambda = 0, \quad \text{(Formula 18)}$$

$i = 1, \ldots, N$

From formula (18), it can be seen that the optimal $\lambda$ must be a positive value, since $\lambda=0$ implies $(\alpha_i + \omega_i \beta_i) = 0$ for all $i=1, \ldots, N$, which is impossible in practice. The formula (18) may be in turn rewritten into the following quadratic formula:

$$A_i q_i^2 + B_i q_i + C_i(\lambda) = 0 \quad \text{(Formula 19)}$$

wherein $A_i = \omega_i \beta_i \theta_i (\alpha_i \gamma_i + \omega_i \beta_i \theta_i)$, $B_i = (\alpha_i + \omega_i \beta_i)(2\omega_i \beta_i \theta_i + \alpha_i \gamma_i)$, and $C_i(\lambda) = (\alpha_i + \omega_i \beta_i)\left(\alpha_i + \omega_i \beta_i - \frac{1}{\lambda}\alpha_i \gamma_i\right).$ The projection of the positive root of this quadratic formula onto $[0, D_i]$ may be given as follows:

$$q_i^* = \left[\frac{\sqrt{B_i^2 - 4A_i C_i(\lambda)} - B_i}{2A_i}\right]_0^{D_i} \quad \text{(Formula 20)}$$

wherein $[.]_0^{D_i}$ represents the projection onto an interval $[0, D_i]$ $A_i = \omega_i \beta_i \theta_i (\alpha_i \gamma_i + \omega_i \beta_i \theta_i)$, $B_i = (\alpha_i + \omega_i \beta_i)(2\omega_i \beta_i \theta_i + \alpha_i \gamma_i)$, $C_i(\lambda) = (\alpha_i + \omega_i \beta_i)\left(\alpha_i + \omega_i \beta_i - \frac{1}{\lambda}\alpha_i \gamma_i\right)$ $D_i = \min\{Q_i, (\alpha_i P_i - \omega_i)/\omega_i \theta_i\}$ $\omega_i = 2^{\rho_i} - 1$ $\alpha_i$ denotes normalized channel gain from the cellular user i to a base station;

$\beta_i$ denotes normalized channel gain from the cellular user i to the D2D receiver;

$\gamma_i$ denotes normalized channel gain from the D2D transmitter to the D2D receiver on frequency band of the cellular user i;

$\theta_i$ denotes normalized channel gain from the D2D transmitter to the base station on frequency band of cellular user i;

$\rho_i$ is a QoS threshold of cellular user i;

$\lambda$ is a Lagrange multiplier;

$Q_i$ is the limit on the transmit power of the D2D pair on frequency band i; and $P_i$ is the power budget of cellular user i.

Additionally, the optimal transmit power of cellular user i may be determined as $$p_i^* = \frac{\omega_i}{\alpha_i}(1 + \theta_i q_i^*).$$

In such a way, it provides the optimal solution to formula (5).

However, it may be seen that there are N+1 unknown parameters including $q_i$ (i=1, ... N) and $\lambda=0$ but there are only N equations. To solve these unknowns, it requires introduce a further equation. It should be noted that, in order to maximize the throughput of the D2D pair, the D2D transmitter will all its power budget, that is to say, the optimal solution will satisfy $\sum_{i=1}^N q_i^* = Q$. By further adding such a equation $\sum_{i=1}^N q_i^* = Q$, the $q_i^*$ and $\lambda^*$ may be solved theoretically.

Given that $q_i^*$ depends on $\lambda$ in a highly nonlinear way, it will be difficult to directly compute the optimal $\lambda$ such that $\sum_{i=1}^N q_i^* = Q$. Nevertheless, observing that each $q_i^*$ is monotonically decreasing in $\lambda$, the optimal $\lambda$, i.e., $\lambda^*$ can be efficiently found via a bisection method and thus $q_i^*$ can be determined. However, the bisection method needs to know an interval containing the $\lambda^*$.

From (20), it can be seen that $q_i^* \geq 0$ if and only if $C_i(\lambda) \leq 0$, which means $$\lambda \leq \frac{\alpha_i \gamma_i}{\alpha_i + \omega_i \beta_i}.$$

Since at the optimal point, amongst $q_i^*$, there must be one or more positive value (otherwise the power constraint $\Sigma_{i=1}^N q_i^* = Q$ will be violated), it can be concluded that $0 \leq \lambda^* \leq \lambda_{max}$. That is to say, the optimal $\lambda$ (i.e., $\lambda^*$) satisfying $\Sigma_{i=1}^N q_i^* = Q$ is within in $[0, \lambda_{max}]$, wherein $$\lambda_{max} \triangleq \max_i \left\{ \frac{\alpha_i \gamma_i}{\alpha_i + \omega_i \beta_i} \right\} \quad \text{(Formula 21)}$$

In such a way, the interval containing the $\lambda^*$ may be determined and the bisection method may be used to find the optimal solution $\lambda^*$ and $q_i^*$.

It should be noted that, to satisfy the QoS requirements of the cellular users, the D2D link may only share resource of one or more of the cellular users but not all frequency bands of the cellular users. For example, in the case that $\Sigma_{i=1}^N D_i > Q$, the optimal Lagrange multiplier may be denoted by $\lambda^*$ and $\lambda_i$ may be calculated as follows:

$$\lambda_i \triangleq \frac{\alpha_i \gamma_i}{\alpha_i + \omega_i \beta_i} \quad \text{(Formula 22)}$$

Then, from formula (20), it can be seen that the ith cellular user's resource is shared by the D2D user if $\lambda_i > \lambda^*$, i.e., the frequency band with large $\lambda_i$ may more likely be used by the D2D user.

Hereinbefore, the optimization resource sharing solution has been provided by jointly optimizing the transmit power of the cellular and D2D users. However, in practice, it may use a much simpler resource sharing solution, which may be called suboptimal resource sharing solution. Next, several alternative solutions will be given.

Suboptimal Resource Sharing Scheme I

The inventors has noticed that, to reduce computational amount of optimal problem, there might be provided a suboptimal design in which only the transmit power of the D2D pair is optimized with the cellular users using a fixed power. For example, the cellular users may simply use but not limited to their respective maximum transmit power, i.e., $p_i = P_i$. Then, the QoS constraint $R_i^c(p_i, q_i) \geq \rho_i$ may be reduced into $q_i \leq (\alpha_i P_i - \omega_i)/\omega_i \theta_i$, and consequently formula (5) may be reduced to the following simple power allocation problem:

$$\max_q \sum_{i=1}^N R_i^d(P_i, q_i) \quad \text{(Formula 23)}$$

$$\text{subject to } 0 \leq q_i \leq D_i,$$

$$i = 1, \ldots, N$$

$$\sum_{i=1}^N q_i \leq Q$$

The definitions of the parameters are similar to those in the optimization problem. Specifically, $D_i = \min\{Q_i, (\alpha_i P_i - \omega_i)/\omega_i \theta_i\}$; $\omega_i = 2^{\rho_i} - 1$; $\alpha_i$ denotes normalized channel gain from the cellular user i to a base station; $\theta_i$ denotes normalized channel gain from the D2D transmitter to the base station on frequency band i; $q_i$ denotes transmit power of the D2D pair on frequency band of cellular user i; $\rho_i$ is a QoS threshold of cellular user i; $Q_i$ is a limit on transmit power of the D2D pair on frequency band i, $P_i$ is power budget of cellular user i and Q is the power budget of the D2D user.

Similarly, if $\Sigma_{i=1}^N D_i \leq Q$ the optimal solution can be simply determined as $q_i^* = D_i$. On the other hand, when $\Sigma_{i=1}^N D_i > Q$, the optimal solution has a standard water filling form as:

$$q_i^* = \left[ \mu - \frac{1 + \beta_i P_i}{\gamma_i} \right]_0^{D_i} \quad \text{(Formula 24)}$$

wherein the water level $\mu$ may be selected such that $\Sigma_{i=1}^N q_i^* = Q$.

Suboptimal Resource Sharing Scheme II

In both of the above-mentioned optimal resource sharing scheme and the suboptimal resource sharing scheme, it allows a D2D pair to share all cellular users' resources, thus leading to the best spectrum efficiency. However, in practice, such sharing may also be restricted to a fixed number of cellular user's resource.

For example, in an embodiment of the present disclosure, only one single cellular user's resource is allowed to be shared by a D2D pair for convenience of management or because of policy restrictions. However, in this case, proper scheduling is needed to associate the D2D link with a cellular user such that the D2D communication can enjoy the maximum benefit while maintaining cellular QoS. In the following, an exemplary method will be provided to achieve the optimal resource sharing between the D2D link and one cellular user.

If the D2D user shares resource with cellular user i, then the maximum throughput that it may achieve under QoS constraint may be obtained by solving the following optimization problem:

$$\max_{p_i, q_i} R_i^d(p_i, q_i) \quad \text{(Formula 25)}$$

$$\text{subject to } R_i^c(p_i, q_i) \geq \rho_i, i = 1, \ldots, N$$

$$0 \leq p_i \leq P_i,$$

$$0 \leq q_i \leq Q_i,$$

$$i = 1, \ldots, N$$

By solving the optimal solution in a similar way to that described with reference to the optimal resource sharing scheme, it can easy find the optimal solution, which will be given by $$q^* = D_n \text{ and } p^* = \frac{\omega_n}{\alpha_n}(1 + \theta_n D_n),$$

wherein the variant "n" may be determined by $$n = \operatorname*{argmax}_i S_i \quad \text{(Formula 26)}$$

The objective value $S_i$ in this suboptimal resource sharing scheme may be given as follows:

$$S_i \triangleq \log\left(1 + \frac{\alpha_i \gamma_i D_i}{\alpha_i + \omega_i \beta_i + \omega_i \beta_i \theta_i D_i}\right) \quad \text{(Formula 27)}$$

However, it should be noted that all these parameters are similar to those mentioned hereinabove except $D_i$. In the above-mentioned optimal resource sharing scheme and the suboptimal resource sharing scheme I, it allows the D2D pair to share resources of a plurality of cellular users, therefore, it may set limits on the transmit power of the D2D user on frequency bands of the plurality of cellular users. By contrast, in this exemplary embodiment of the suboptimal resource sharing scheme II, the D2D pair can only share resource of one cellular user, and thus it is unnecessary to set a limit on the transmit power of the D2D user on frequency band of one cellular user seems. Thus, in such a case, $D_i$ may be provided by $D_i = \min\{Q, (\alpha_i P_i - \omega_i)/\omega_i \theta_i\}$.

For definitions of the parameters similar to those in the optimization resource sharing solution, please refer to the above relative description and they are omitted herein for a purpose of simplification and clarity.

It should be appreciated that for this suboptimal scheme II, it also be possible to let the cellular user i using a fixed transmit power, for example its power budget $P_i$. Besides, it is also be possible to allow the D2D user to share resources of other fixed number of cellular users. With the teaching provided therein, these and other possible alternative solutions will be easily implemented by the skilled in the art and thus detailed explanation will be omitted for a purpose of clarity and simplicity.

It may be seen that the major advantage of the suboptimal resource sharing schemes I and II lies in that computational complexity and signaling overheads is reduced over the optimal resource sharing scheme in which the transmit power of the D2D pair and the transmit power of the cellular user are jointly optimized.

Figure 3:
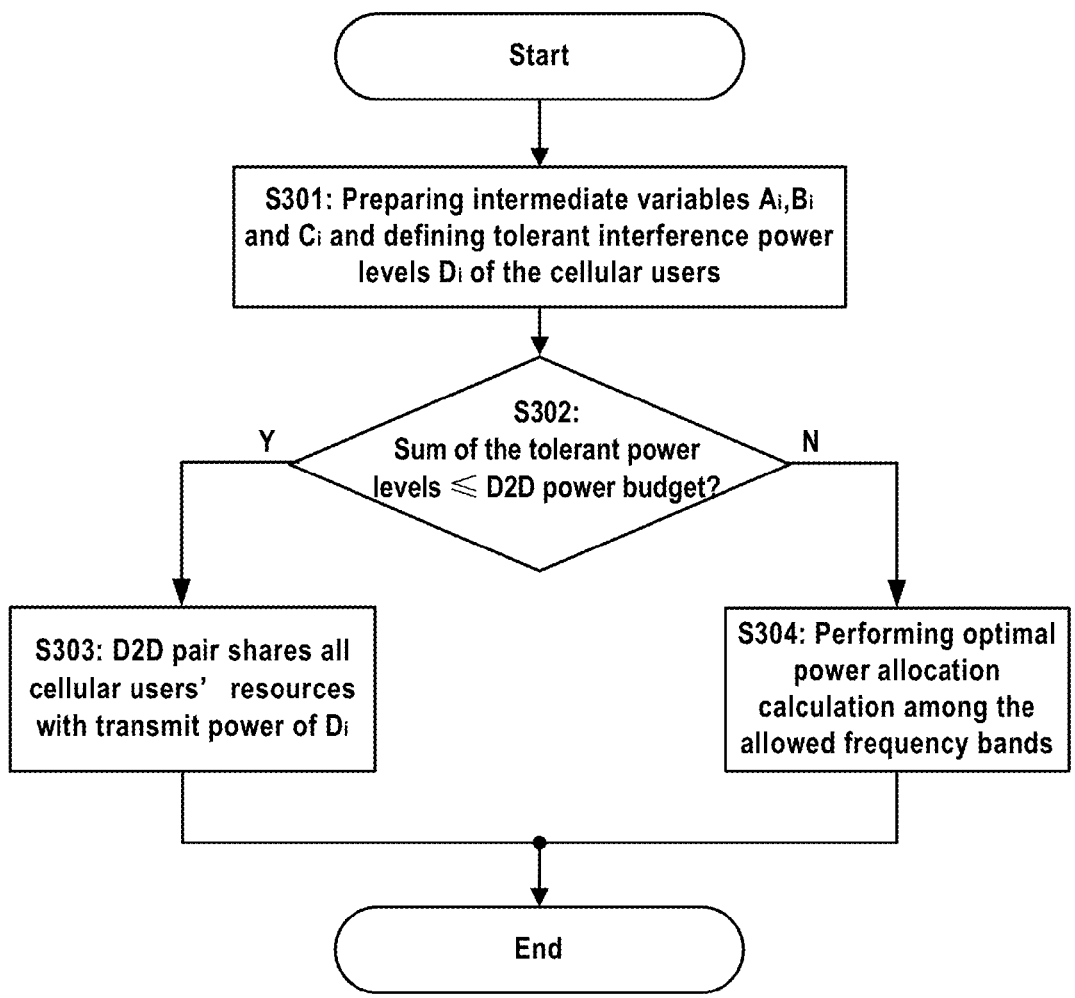
FIG. 3 schematically illustrates a flow chart for determining transmit power for a D2D pair and cellular users according to an embodiment of the present disclosure.

Next, FIG. 3 is referenced to describe a flow chart for determining transmit power for a D2D pair and cellular users according to an embodiment of the present disclosure, which may be called as optimal power allocation scheme. As illustrated, first at step 301, intermediate variances $A_i$, $B_i$ and $C_i$ will be prepared for subsequent allocation calculation and the tolerant interference power levels $D_i$ of the cellular users are defined. Then as step S302, it may determine whether the sum of the tolerant power levels is lower than or equal to the D2D power budget Q. If the sum of the tolerant power levels is lower than or equal to the D2D power budget Q, then at step S303, the D2D transmitter may share all cellular user's frequency bands with transmit power of $D_i$. Then, the transmit power $p_i^*$ of the cellular user i may be determined as $$p_i^* = \frac{\omega_i}{\alpha_i}(1 + \theta_i D_i).$$

On the other hand, when the sum of the tolerant power levels is higher than the D2D power budget Q, the optimization power allocation calculation will be performed among the allowed frequency bands. As mentioned hereinabove, $\lambda^*$ and $q_i^*$ may be efficiently found via the bisection method. For a purpose of illustration, detailed operations of the bisection method will be explained with reference to FIG. 4, which schematically illustrates a flow chart for optimal power allocation calculation for a D2D pair and cellular users according to an embodiment of the present disclosure.

Figure 4:
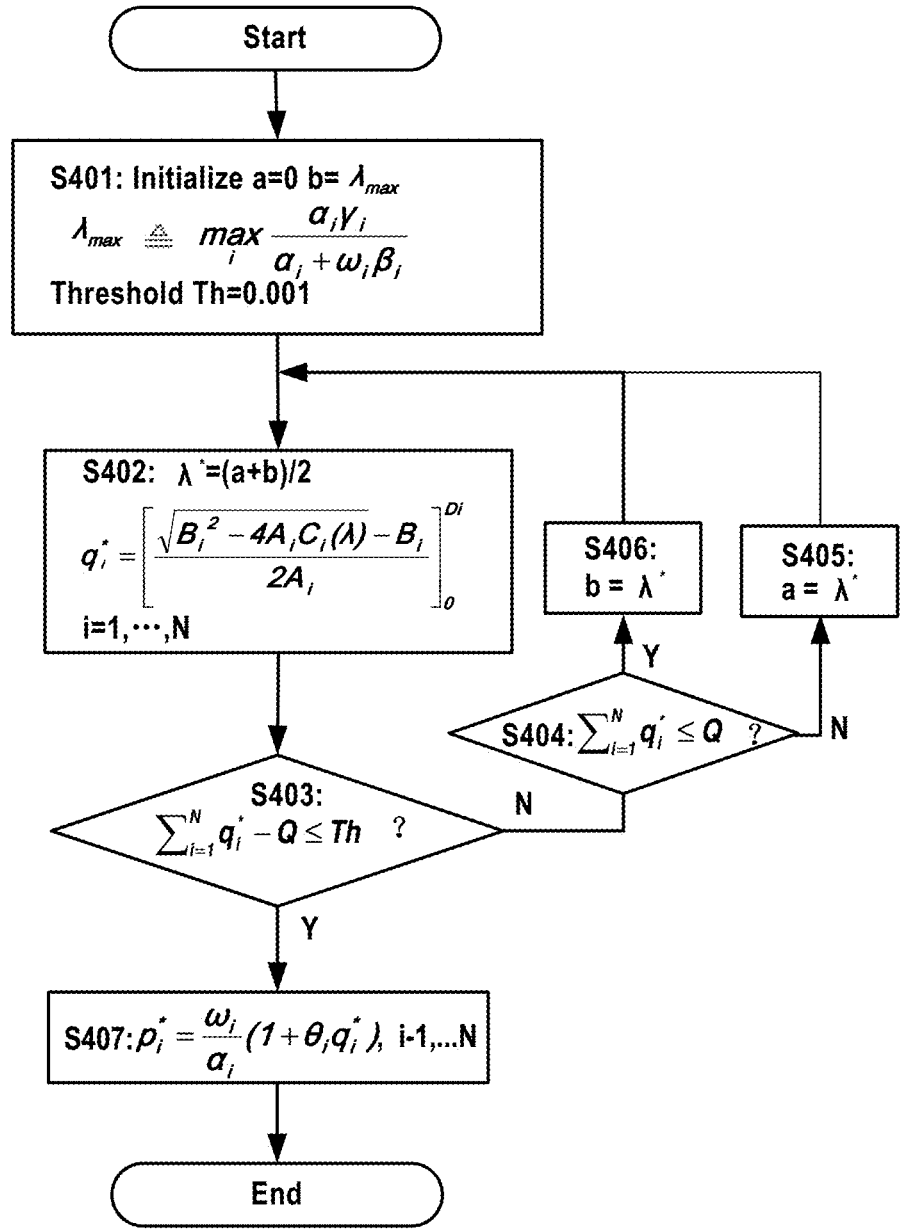
FIG. 4 schematically illustrates a flow chart for optimal power allocation calculation for a D2D pair and cellular users according to an embodiment of the present disclosure.

As illustrated in FIG. 4, first at step S401, two parameters a and b are initialized, wherein a is initialized as zero, and b is initialized as $\lambda_{max}$. The parameter $\lambda_{max}$ may be determined by formula (21). Additionally, there is defined a threshold Th which limits the acceptable difference between the sum of $q_i^*$ and the D2D power budget Q. Then at step S402, $\lambda^*$ is given a value of (a+b)/2 and $q_i^*$ is calculated according to formula (19). At step S403, it determines whether the difference between the sum of $q_i^*$ and the power budget Q of the D2D pair is lower then or equal to the threshold Th. If yes, it means that the optimal transmit power $q_i^*$ of the D2D pair on frequency band i has been found and the method proceed into step S407 in which the optimal transmit power $p_i$ of the cellular users is determined as $$p_i^* = \frac{\omega_i}{\alpha_i}(1 + \theta_i q_i^*).$$

On the other hand, if the difference is still higher than the threshold Th, the method will proceed into step S404, it determines whether the sum of $q_i^*$ is equal to or less than the D2D power budget Q. If no, then at step S405, parameter a is given a value of $\lambda^*$; otherwise at step S406, parameter b is given a value of $\lambda^*$. Then the method proceeds into step S402 again and repeats the operations in step S402 until the difference between the sum of $q_i^*$ and the D2D power budget Q is lower than the threshold Th. By means of such a bisection method, the $q_i^*$ and $p_i^*$ may be efficiently determined.

Figure 5:
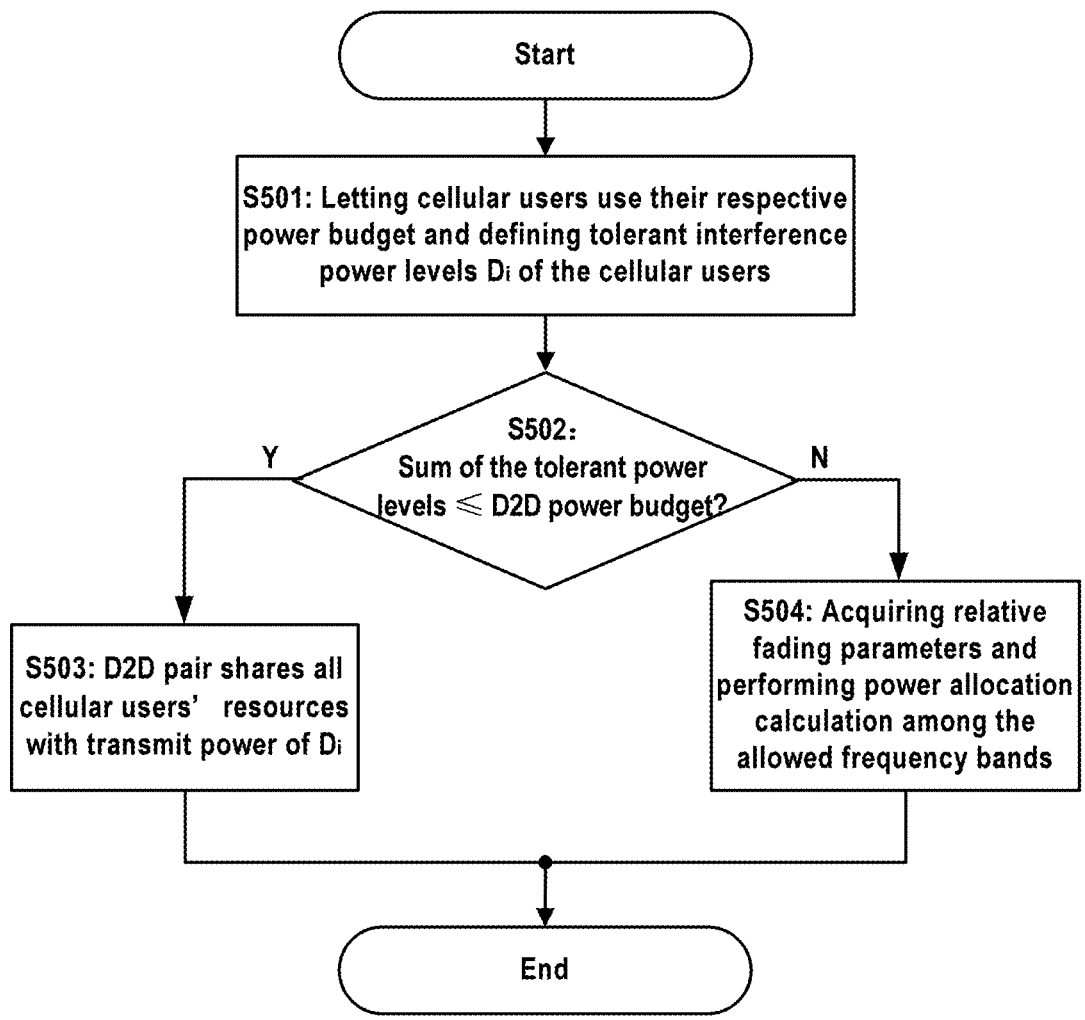
FIG. 5 schematically illustrates a flow chart for determining transmit power for a D2D pair and cellular users according to another embodiment of the present disclosure.

Additionally, FIG. 5 also schematically illustrates a flow chart for determining transmit power for a D2D pair and cellular users according to another embodiment of the present disclosure. Actually, this solution is based on the suboptimal scheme I which is a simplified form of the optimal resource sharing scheme and wherein the cellular user i uses it own power budget for signal transmission. As illustrated in FIG. 5, first as step S501, cellular users are allowed to use their respective maximal transmit power (i.e., their power budget) for signal transmission and the tolerant interference power levels $D_i$ of the cellular users are defined. Then, similarly to that in step S302, it determine whether a sum of the tolerant power levels $D_i$ is lower than or equal to the D2D power budget Q at step S502. If the sum is lower than or equal to the D2D power budget Q, then at step S503, the D2D transmitter may share all cellular user's frequency bands with transmit power of $D_i$ and the transmit power $p_i^*$ of the cellular user i may be determined as $$p_i^* = \frac{\omega_i}{\alpha_i}(1 + \theta_i D_i).$$

On the other hand, if the sum is higher than the D2D power budget Q, the relative fading parameters $\gamma_i$ and $\beta_i$ may be acquired and power allocation calculation may be made among the allowed frequency bands based on formula (24).

Figure 6:
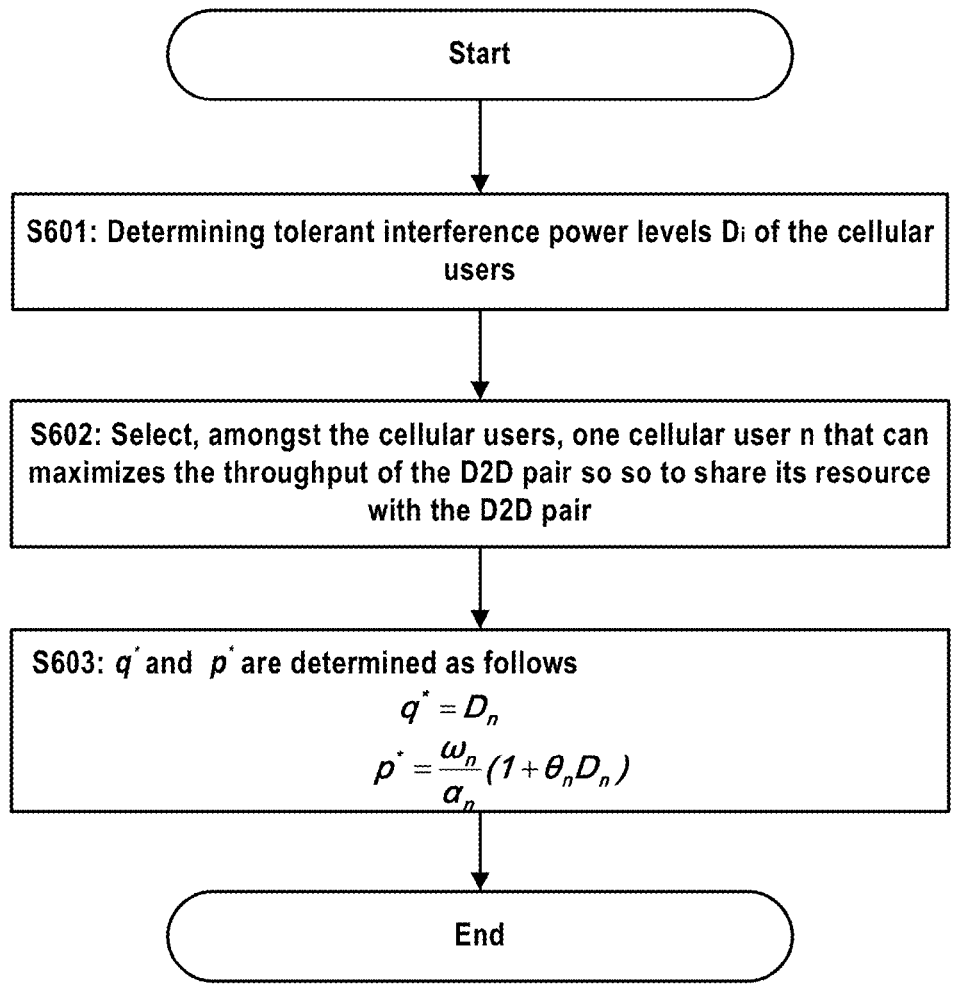
FIG. 6 schematically illustrates a flow chart for determining transmit power for a D2D pair and cellular users according to a further embodiment of the present disclosure.

Besides, there is also schematically illustrates in FIG. 6 a flow chart for determining transmit power for a D2D pair and cellular users according to a further embodiment of the present disclosure. This solution is based on the suboptimal scheme II which is a simplified form of the optimal resource sharing scheme and in which the D2D pair is allowed to share resource of only one cellular user. As illustrated in FIG. 6, the tolerant interference power levels of the cellular users are defined at step S601. Then one cellular user n that can maximize the throughput of the D2D pair is selected from cellular users in the cellular user set, so as to share resource with the D2D pair. The one cellular user n may be determined according to formulas (26). Then at S603, the optimal transmit power of the D2D pair and the optimal transmit power of the selected cellular user n is $$q^* = D_n \text{ and } p^* = \frac{\omega_n}{\alpha_n}(1 + \theta_n D_n),$$

respectively.

After having determined the transmit power for the D2D pair and the cellular users, the BS may transmit the power allocation results to D2D users and respective cellular users through control. Actually, the BS has not only informed the transmit power of the D2D pair on frequency bands of the cellular users and the transmit power of the cellular user but also figure out which cellular's resource can be shared by the D2D pair. Since if the transmit power of the D2D pair on a frequency band is zero, it means that the D2D pair can not share the frequency band.

At the same time, the D2D users and the cellular user may monitor the control channel so as to obtain the power allocation results. Then, both cellular users and the D2D pair may transmit signals through allocated resource with the determined transmit power.

If a D2D transmission is terminated, the method may be ended; otherwise, it determines whether a scheduling period is expired. In the present disclosure, the scheduling period is a time interval during which all fading parameters are considered as not changed, and it may be several TTIs. If the scheduling period is expired, the method may be re-performed to determined a new resource sharing solution; otherwise, the cellular users and the D2D pair continue to transmit signals through allocated resource with the determined transmit power.

Figure 7:
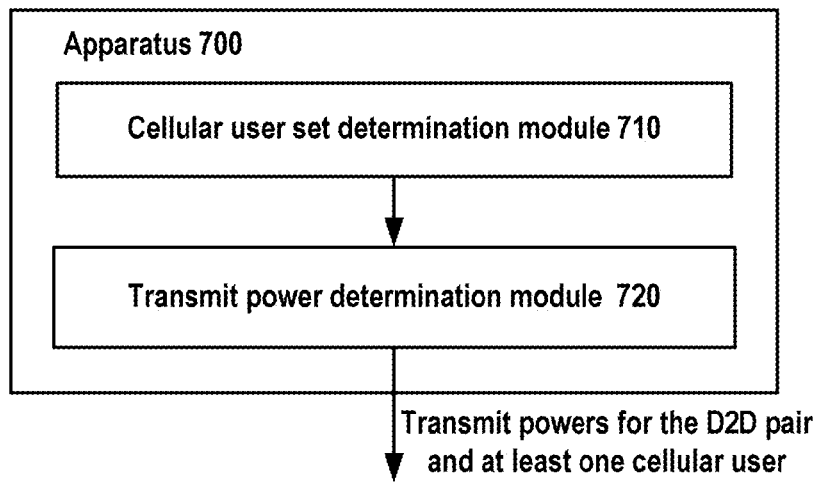
FIG. 7 schematically illustrates a block diagram of an apparatus of resource sharing for D2D and cellular communications according to an embodiment of the present disclosure.

Additionally, in the present disclosure, there is also provided an apparatus of resource sharing for D2D and cellular communications. Hereinbelow, reference will be made to FIG. 7 to explain an apparatus of resource sharing for D2D and cellular communications according to an embodiment of the present disclosure. As illustrated, apparatus 700 may comprise: cellular user set determination module 710 and transmit power determination module 720. The cellular user set determination module 710 may be configured to determine a cellular user set containing potential cellular users that may share resources with a D2D pair. The transmit power determination module 720 may be configured to determine transmit power of the D2D pair on a frequency band of at least one cellular user in the cellular user set and transmit power of the at least one cellular user through maximizing throughput of the D2D pair with quality of service (QoS) constraint and power budget constraint of each of the potential cellular users and transmit power constraint of the D2D pair.

In an embodiment of the present disclosure, the cellular user set determination module 710 may be further configured to: for each of scheduled cellular users, perform a feasibility checking to find cellular users whose QoS can be guaranteed without resource sharing.

In another embodiment of the present disclosure, the performing the feasibility checking may comprise determining whether power budget of each of scheduled cellular user satisfy: $2^{\rho_i}-1 \leq \alpha_i P_i$, wherein $\rho_i$ is a QoS threshold of cellular user i, $\alpha_i$ denotes normalized channel gain from the cellular user i to a base station; and $P_i$ is power budget of the cellular user i.

In a further embodiment of the present disclosure, the transmit power determination module 720 may be configured to, in a case that a sum of tolerant interference power levels of all potential cellular users contained in the cellular user set is lower than or equal to power budget of the D2D pair, determine the transmit power of the D2D pair on the frequency band of the at least one cellular user and the transmit power of the at least one cellular user as $$q_i^* = D_i \text{ and } p_i^* = \frac{\omega_i}{\alpha_i}(1 + \theta_i D_i),$$

wherein $$D_i = \min\{Q_i, (\alpha_i P_i - \omega_i)/\omega_i \theta_i\};$$

$$\omega_i = 2^{\rho_i} - 1;$$

$\omega_i$ is a limit on transmit power of the D2D pair on frequency band of cellular user i, $\alpha_i$ denotes normalized channel gain from the cellular user i to a base station; $\theta_i$ denotes normalized channel gain from the D2D transmitter to the base station on frequency band of the cellular user i; $\rho_i$ is a QoS threshold of the cellular user i; and $P_i$ is power budget of the cellular user i.

In a still further embodiment of the present disclosure, the optimal transmit power $p_i^*$ of the potential cellular users may meet:

$$p_i^* = \frac{\omega_i}{\alpha_i}(1 + \theta_i q_i),$$

$\omega_i = 2^{\rho_i} - 1$, wherein $\rho_i$ is a QoS threshold of cellular user i, $\alpha_i$ denotes normalized channel gain from the cellular user i to a base station; $\theta_i$ denotes normalized channel gain from the D2D transmitter to the base station on frequency band of the cellular user i, and $q_i$ is transmit power of the D2D transmitter on the frequency band of the cellular user i.

In a still further embodiment of the present disclosure, optimal transmit power $q_i^*$ of the D2D pair on frequency band of the potential cellular user i meet $\Sigma_{i=1}^{N} q_i^* = Q$, wherein Q denotes the power budget of the D2D user.

In a still yet further embodiment of the present disclosure, the transmit power determination module 720 may be configured to, in a case that a sum of tolerant interference power levels of all potential cellular users contained in the cellular user set is higher than power budget of the D2D pair, determine the transmit power of the D2D pair on the frequency band of the at least one cellular user and the transmit power of the at least one cellular user i as $$q_i^* = \left[\frac{\sqrt{B_i^2 - 4A_i C_i(\lambda)} - B_i}{2A_i}\right]_0^{D_i},$$

and $$p_i^* = \frac{\omega_i}{\alpha_i}(1 + \theta_i q_i^*)$$

wherein $[.]_0^{D_i}$ represents the projection onto an interval $[0, D_i]$;

$$A_i = \omega_i \beta_i \theta_i (\alpha_i \gamma_i + \omega_i \beta_i \theta_i);$$

$$B_i = (\alpha_i + \omega_i \beta_i)(2\omega_i \beta_i \theta_i + \alpha_i \gamma_i);$$

$$C_i(\lambda) = (\alpha_i + \omega_i \beta_i)\left(\alpha_i + \omega_i \beta_i - \frac{1}{\lambda}\alpha_i \gamma_i\right);$$

$$D_i = \min\{Q_i, (\alpha_i P_i - \omega_i)/\omega_i \theta_i\};$$

$$\omega_i = 2^{\rho_i} - 1;$$

$\alpha_i$ denotes normalized channel gain from cellular user i to a base station; $\beta_i$ denotes normalized channel gain from the cellular user i to the D2D receiver; $\gamma_i$ denotes normalized channel gain from the D2D transmitter to the D2D receiver on frequency band of the cellular user i; $\theta_i$ denotes normalized channel gain from the D2D transmitter to the base station on frequency band of the cellular user i; $\rho_i$ is a QoS threshold of the cellular user i; $\lambda$ is a Lagrange multiplier; $Q_i$ is a limit on transmit power of the D2D pair on frequency band i; and $P_i$ is power budget of the cellular user i.

In another embodiment of the present disclosure, wherein the transmit power determination module 720 may be configured to determine transmit power of each of the potential cellular users as a fixed value. For example, the fixed power may be power budget of each of the potential cellular users. The transmit power determination module 720 may be configured to determine the transmit power of the D2D pair on frequency band of at least one cellular user i as:

$$q_i^* = \left[\mu - \frac{1 + \beta_i P_i}{\gamma_i}\right]_0^{D_i}$$

wherein $\mu$ denotes a water level value; $[.]_0^{D_i}$ represents the projection onto an interval $[0, D_i]$; $D_i = \min\{Q_i, (\alpha_i P_i - \omega_i)/\omega_i \theta_i\}$ and $\omega_i = 2^{\rho_i} - 1$; $\alpha_i$ denotes normalized channel gain from the cellular user i to a base station; $\beta_i$ denotes normalized channel gain from the cellular user i to the D2D receiver; $\gamma_i$ denotes normalized channel gain from the D2D transmitter to the D2D receiver on frequency band of the cellular user i; $\theta_i$ denotes normalized channel gain from the D2D transmitter to the base station; $P_i$ is the power budget of the cellular user i; $\rho_i$ is a QoS threshold of cellular user i; and $Q_i$ is a limit on transmit power of the D2D pair on frequency band i.

In a further embodiment of the present disclosure, wherein the transmit power determination module, wherein a fixed number of cellular users are selected from the cellular user set for resource sharing with the D2D pair. The fixed number may be for example one. In such a case, the transmit power determination module 720 may be configured to determine the transmit power q* of the D2D pair on frequency band of cellular user n which is selected for resource sharing with the D2D pair and the transmit power p* of the cellular user n as:

$$q^* = D_n, \quad p^* = \frac{\omega_n}{\alpha_n}(1 + \theta_n D_n),$$

$$\text{wherein } n = \arg\max_i S_i, \quad S_i = \log\left(1 + \frac{\alpha_i \gamma_i D_i}{\alpha_i + \omega_i \beta_i + \omega_i \beta_i \theta_i q_i}\right),$$

$$\omega_i = 2^{\rho_i} - 1,$$

wherein $\alpha_i$ denotes normalized channel gain from the cellular user i to a base station; $\beta_i$ denotes normalized channel gain from the cellular user i to the D2D receiver; $\gamma_i$ denotes normalized channel gain from the D2D transmitter to the D2D receiver on frequency band of the cellular user i; $\theta_i$ denotes normalized channel gain from the D2D transmitter to the base station on frequency band of the cellular user i; $q_i$ denotes transmit power of the D2D pair on frequency band of the cellular user i; $\rho_i$ is QoS threshold of cellular user i; $D_i = \min\{Q_i, (\alpha_i P_i - \omega_i)/\omega_i \theta_i\}$; Q denotes power budget of the D2D pair; and $P_i$ is power budget of cellular user i.

Additionally, in a further embodiment of the present disclosure, the apparatus is configured to re-operate in response to expiring of a scheduling period.

It should be noted that the operations of respective module in apparatus 700 is substantially similar to those step in method described with reference to FIGS. 2 to 6. Hence, for details about the operations of these module, one may refer to those description made with respect to the respective steps of the methods with reference to FIGS. 2 to 6.

Besides, to check effects of embodiments as provided in the present disclosure, the present inventors have performed simulations on the optimal resource sharing scheme, the suboptimal resource sharing schemes I and II as provided in the present disclosure and the prior art scheme which is proposed by C.-H. Yu et al. The optimal power allocation scheme is a solution determining the transmit power based on formulas (16) to (21) where the transmit power of the D2D users and the cellular user are jointly optimized, and for short it is denoted by "Optimal Scheme" in FIGS. 8 to 10. The suboptimal resource sharing scheme I is a solution determining the transmit power based on formulas (22) to (23) wherein the cellular users user their respective power budget for signal transmission, and in FIGS. 8 to 10, it is denoted by "Suboptimal Scheme I" for short. The suboptimal resource sharing scheme II is a solution determining the transmit power based on formulas (24) to (26) wherein it only allow the D2D pair share one cellular user's resource and in FIGS. 8 to 10, it is denoted by "Suboptimal Scheme II". The prior art scheme is a solution proposed in Sec. III-B in the paper of C.-H. Yu et al. However, since the scheme per se is only a scheme for one cellular user, for fairness, it has been extended to multiple cellular users by paring the D2D link with one cellular user that leads to the best performance.

Additionally, in these simulations, $Q_i$ is set as ∞ for the optimal scheme and the suboptimal schemes I, $Q_i$ is set as Q for the suboptimal scheme II, and $P_{max}$ is set as Q for the prior art scheme. Besides, the cellular users are uniformly located in a hexagonal cell with a radius of 500 m and the D2D transmitter is 20 m away from its receiver and located 300 m away from the base station. The received SNRs of all cellular users are set 10 dB for fairness and the channels are generated according to i.i.d. Gaussian distributions with zero man and unit variance and the path loss follows $d^{-\alpha}$ with distance d and $\alpha=3$.

Figure 8:
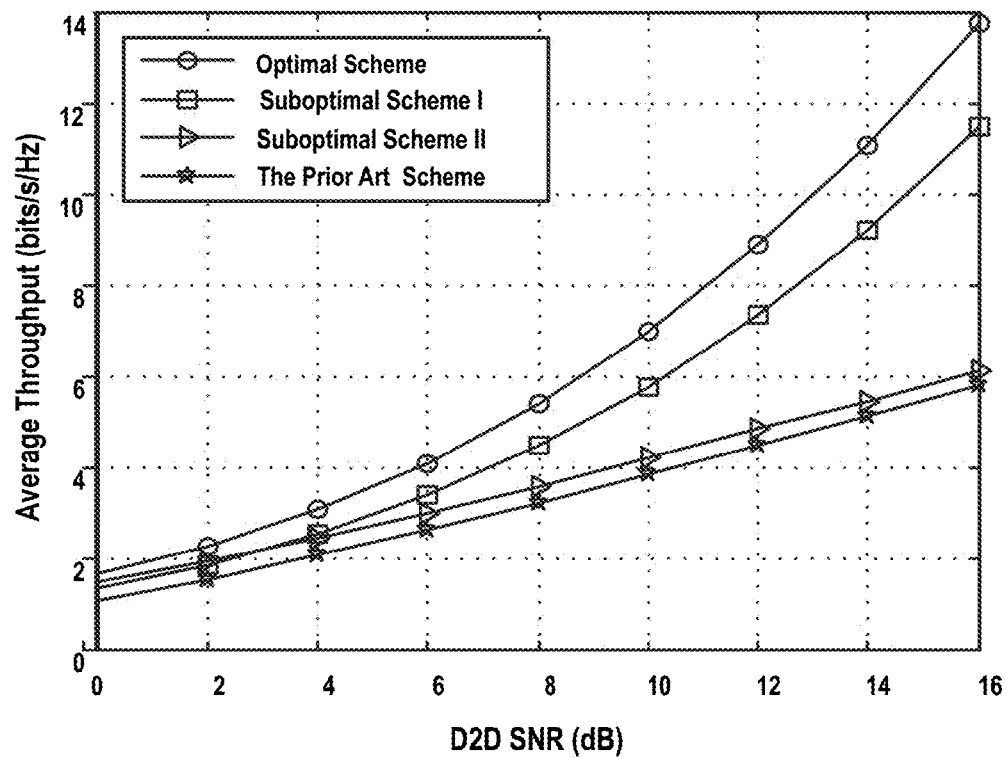
FIG. 8 schematically illustrates average throughput of the D2D user at different signal noise ratios (SNRs) according to optimal scheme, suboptimal scheme I, and suboptimal scheme II as provided in the present disclosure and a prior art scheme.

Reference is first made to FIG. 8, which schematically illustrates average throughput of the D2D user at different signal noise ratios (SNRs, i.e. $Q/\sigma_{ii}^d$) according to the optimal scheme, the suboptimal scheme I, the suboptimal scheme II and the prior art scheme, wherein there are 8 cellular users, the QoS threshold $\rho_i=1$. From these plots illustrated in FIG. 8, it can be seen that the optimal scheme provides the best performance for D2D communication by fully utilizing all available cellular resources and the suboptimal schemes I and II may also achieve better performance than the prior art scheme.

Figure 9:
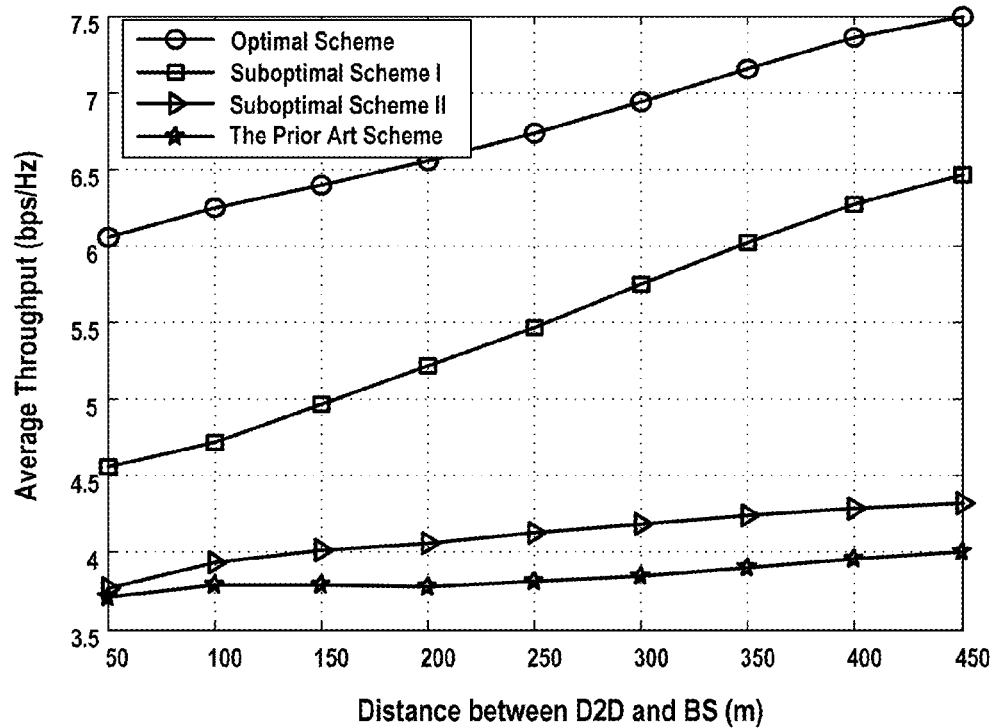
FIG. 9 schematically illustrates average throughput of the D2D user at different distances from the BS according to optimal scheme, suboptimal scheme I, and suboptimal scheme II as provided in the present disclosure and a prior art scheme.

FIG. 9 schematically illustrates average throughput of the D2D user at different distance from the BS, wherein there are 8 cellular users, the QoS threshold $\rho_i=1$ and the D2D SNR is at 10 dB. As illustrated, the D2D link, as it moves away from the BS, will cause less interference to the cellular users, which means that the D2D link can achieve a higher throughput while still satisfying the cellular QoS constraints. That is to say, the schemes as provided herein may provide substantial performance gains similar to those in FIG. 8.

Figure 10:
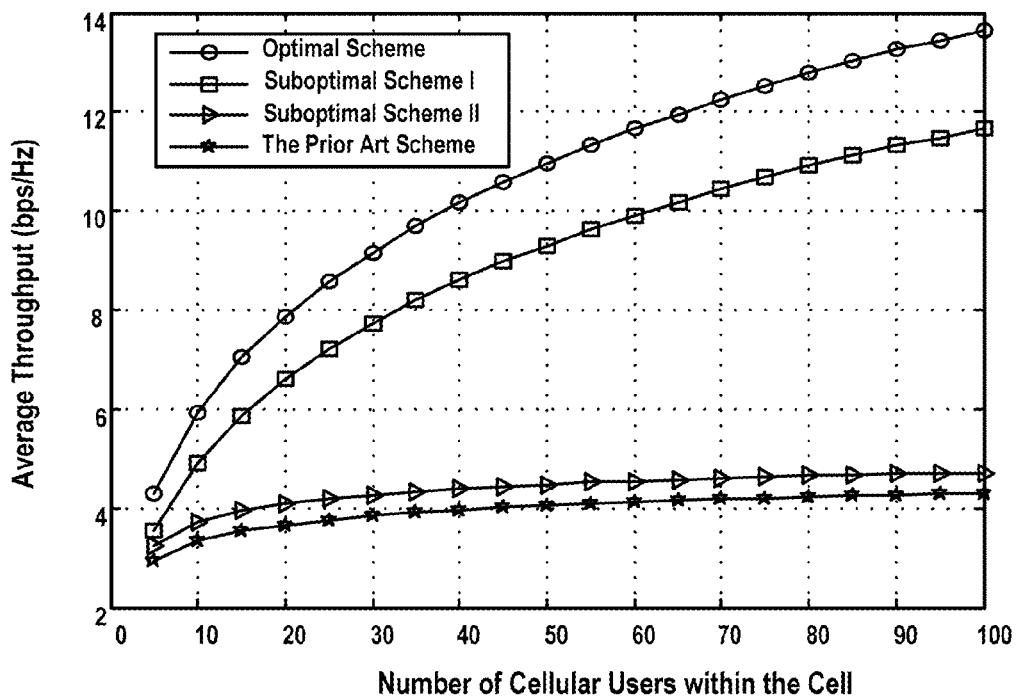
FIG. 10 schematically illustrates average throughput of the D2D user with different numbers of the cellular users according to optimal scheme, suboptimal scheme I, and suboptimal scheme II as provided in the present disclosure and a prior art scheme.

FIG. 10 schematically illustrates average throughput of the D2D user with different numbers of the cellular users, wherein the QoS threshold $\rho_i=1$ and the D2D SNR is at 6 dB. From the simulation results, it may be seen that, as the number of the cellular users increases, the optimal scheme and the suboptimal scheme I may achieve a higher throughput of the D2D link, however, the suboptimal scheme II fails to do so since it only allows the D2D pair share one cellular's resource.

Therefore, it is clear that with embodiments of the present disclosure, it may provide a non-orthogonal resource sharing solution in which a D2D pair can reuse resources of the cellular users as more as possible while the QoS of all the cellular users are guaranteed, whereby the performance of the D2D user may be improved greatly.

By far, the present disclosure has been described with reference to the accompanying drawings through particular preferred embodiments. However, it should be noted that the present disclosure is not limited to the illustrated and provided particular embodiments, but various modification may be made within the scope of the present disclosure.

Further, the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example by firmware.

Though the present disclosure has been described with reference to the currently considered embodiments, it should be appreciated that the present disclosure is not limited to the disclosed embodiments. On the contrary, the present disclosure is intended to cover various modifications and equivalent arrangements falling within in the spirit and scope of the appended claims. The scope of the appended claims is accorded with the broadest explanations and covers all such modifications and equivalent structures and functions.

What is claimed is:

1. A method of resource sharing for device-to-device (D2D) and cellular communications, comprising:
    determining a cellular user set containing potential cellular users that may share resources with a D2D pair; and
    determining transmit power of the D2D pair on a frequency band of at least one cellular user in the cellular user set and transmit power of the at least one cellular user through maximizing throughput of the D2D pair with a quality of service (QoS) constraint and a power budget constraint of each of the potential cellular users and a transmit power constraint of the D2D pair,
    wherein the determining the cellular user set comprises:
    for each of scheduled cellular users, performing a feasibility checking to find cellular users whose QoS can be guaranteed without resource sharing, and
    wherein the performing the feasibility checking comprises:
    determining whether power budget of each of the scheduled cellular users satisfy:

$$2^{\rho_i}-1 \leq \alpha_i P_i$$

wherein $\rho_i$ is a QoS threshold of cellular user i, $\alpha_i$ denotes normalized channel gain from the cellular user i to a base station; and $P_i$ is power budget of the cellular user i.

2. The method according to claim 1, wherein in a case that a sum of tolerant interference power levels of all potential cellular users contained in the cellular user set is lower than or equal to power budget of the D2D pair, the transmit power of the D2D pair on the frequency band of the at least one cellular user and the transmit power of the at least one cellular user i are determined as $$q_i^* = D_i \text{ and } p_i^* = \frac{\omega_i}{\alpha_i}(1+\theta_i D_i),$$

wherein $$D_i = \min\{Q_i, (\alpha_i P_i - \omega_i)/\omega_i \theta_i\}; \omega_i = 2^{\rho_i}-1;$$

wherein $D_i = \min\{Q_i, (\alpha_i P_i - \omega_i)/\omega_i \theta_i\}$; $\omega_i=2^{\rho_i}-1$;
$Q_i$ is a limit on transmit power of the D2D pair on frequency band of cellular user i;
$\alpha_i$ denotes normalized channel gain from the cellular user i to a base station;
$\theta_i$ denotes normalized channel gain from the D2D transmitter to the base station on frequency band of the cellular user i;
$\rho_i$ is a QoS threshold of the cellular user i; and
$P_i$ is power budget of the cellular user i.

3. The method according to claim 1, wherein optimal transmit power $p_i^*$ of the potential cellular users meet:

$$p_i^* = \frac{\omega_i}{\alpha_i}(1+\theta_i q_i), \omega_i = 2^{\rho_i}-1$$

wherein $\rho_i$ is a QoS threshold of cellular user i, $\alpha_i$ denotes normalized channel gain from the cellular user i to a base station; $\theta_i$ denotes normalized channel gain from the D2D transmitter to the base station on frequency band of the cellular user i, and $q_i$ is transmit power of the D2D transmitter on the frequency band of the cellular user i.

4. The method according to claim 3, wherein optimal transmit power $q_i^*$ of the D2D pair on frequency band of the potential cellular user i meet:

$$\Sigma_{i=1}^{N} q_i^* = Q$$

wherein Q denotes power budget of the D2D pair.

5. The method according to claim 4, wherein in a case that a sum of tolerant interference power levels of all potential cellular users contained in the cellular user set is higher than power budget of the D2D pair, the transmit power of the D2D pair on the frequency band of the at least one cellular user and the transmit power of the at least one cellular user are determined as $$q_i^* = \left[\frac{\sqrt{B_i^2 - 4A_i C_i(\lambda)} - B_i}{2A_i}\right]_0^{D_i}, \text{ and } p_i^* = \frac{\omega_i}{\alpha_i}(1 + \theta_i q_i^*)$$

wherein $[.]_0^{D_i}$ represents the projection onto an interval $[0, D_i]$;

$$A_i = \omega_i \beta_i \theta_i (\alpha_i \gamma_i + \omega_i \beta_i \theta_i);$$

$$B_i = (\alpha_i + \omega_i \beta_i)(2\omega_i \beta_i \theta_i + \alpha_i \gamma_i);$$

$$C_i(\lambda) = (\alpha_i + \omega_i \beta_i)\left(\alpha_i + \omega_i \beta_i - \frac{1}{\lambda}\alpha_i \gamma_i\right);$$

$$D_i = \min\{Q_i, (\alpha_i P_i - \omega_i)/\omega_i \theta_i\};$$

$$\omega_i = 2^{\rho_i} - 1;$$

$\alpha_i$ denotes normalized channel gain from cellular user i to a base station;

$\beta_i$ denotes normalized channel gain from the cellular user i to the D2D receiver;

$\gamma_i$ denotes normalized channel gain from the D2D transmitter to the D2D receiver on frequency band of the cellular user i;

$\theta_i$ denotes normalized channel gain from the D2D transmitter to the base station on frequency band of the cellular user i;

$\rho_i$ is a QoS threshold of the cellular user i;

$\lambda$ is a Lagrange multiplier;

$Q_i$ is a limit on transmit power of the D2D pair on frequency band of the cellular user i; and $P_i$ is power budget of the cellular user i.

6. The method according to claim 1, wherein transmit power of each of the potential cellular users is determined as a fixed value.

7. The method according to claim 6, wherein the fixed power is power budget of each of the potential cellular users, and wherein the transmit power of the D2D pair on frequency band of at least one cellular user is determined as:

$$q_i^* = \left[\mu - \frac{1 + \beta_i P_i}{\gamma_i}\right]_0^{D_i}$$

wherein $\mu$ denotes a water level value;

$[.]_0^{D_i}$ represents the projection onto an interval $[0, D_i]$;

$D_i = \min\{Q_i, (\alpha_i P_i - \omega_i)/\omega_i \theta_i\}$ and $\omega_i = 2^{\rho_i} - 1$;

$\alpha_i$ denotes normalized channel gain from cellular user i to a base station;

$\beta_i$ denotes normalized channel gain from the cellular user i to the D2D receiver;

$\gamma_i$ denotes normalized channel gain from the D2D transmitter to the D2D receiver on frequency band of the cellular user i;

$\theta_i$ denotes normalized channel gain from the D2D transmitter to the base station on frequency band of the cellular user i;

$P_i$ is power budget of the cellular user i;

$\rho_i$ is a QoS threshold of the cellular user i; and $Q_i$ is a limit on transmit power of the D2D pair on frequency band of the cellular user i.

8. The method according to claim 1, wherein a fixed number of cellular users are selected from the cellular user set for resource sharing with the D2D pair, and wherein the fixed number is one.

9. The method according to claim 8, wherein the transmit power q* of the D2D pair on frequency band of cellular user n which is selected for resource sharing with the D2D pair and the transmit power p* of the cellular user n are determined respectively as:

$$q^* = D_n, p^* = \frac{\omega_n}{\alpha_n}(1 + \theta_n D_n),$$

wherein $$n = \underset{i}{\mathrm{argmax}} S_i, S_i = \log\left(1 + \frac{\alpha_i \gamma_i D_i}{\alpha_i + \omega_i \beta_i + \omega_i \beta_i \theta_i D_i}\right),$$

$D_i = \min\{Q, (\alpha_i P_i - \omega_i)/\omega_i \theta_i\}$ and $\omega_i = 2^{\rho_i} - 1$, wherein $\alpha_i$ denotes normalized channel gain from cellular user i to a base station;

$\beta_i$ denotes normalized channel gain from the cellular user i to the D2D receiver;

$\gamma_i$ denotes normalized channel gain from the D2D transmitter to the D2D receiver on frequency band of the cellular user i;

$\theta_i$ denotes normalized channel gain from the D2D transmitter to the base station on frequency band of the cellular user i;

$q_i$ denotes transmit power of the D2D pair on frequency band of the cellular user i;

$\rho_i$ is a QoS threshold of the cellular user i;

Q denotes power budget of the D2D pair; and $P_i$ is power budget of the cellular user i.

10. The method according to claim 1, wherein the method is re-performed in response to expiring of a scheduling period.

11. An apparatus of resource sharing for D2D and cellular communications, comprising:

cellular user set determination module configured to determine a cellular user set containing potential cellular users that may share resources with a D2D pair; and transmit power determination module configured to determine transmit power of the D2D pair on a frequency band of at least one cellular user in the cellular user set and transmit power of the at least one cellular user through maximizing throughput of the D2D pair with a quality of service (QoS) constraint and a power budget constraint of each of the potential cellular users and a transmit power constraint of the D2D pair, wherein the cellular user set determination module is further configured to:

for each of scheduled cellular users, perform a feasibility checking to find cellular users whose QoS can be guaranteed without resource sharing, and wherein the performing the feasibility checking comprises:
determining whether power budget of each of the scheduled cellular users satisfy:

$$2^{\rho_i}-1 \leq \alpha_i P_i$$

wherein $\rho_i$ is a QoS threshold of cellular user i, $\alpha_i$ denotes normalized channel gain from the cellular user i to a base station; and $P_i$ is power budget of the cellular user i.

12. The apparatus according to claim 11, wherein the transmit power determination module is configured to,
in a case that a sum of tolerant interference power levels of all potential cellular users contained in the cellular user set is lower than or equal to power budget of the D2D pair, determine the transmit power of the D2D pair on the frequency band of the at least one cellular user and the transmit power of the at least one cellular user i as $$q_i^* = D_i \text{ and } p_i^* = \frac{\omega_i}{\alpha_i}(1+\theta_i D_i),$$

wherein $D_i = \min\{Q_i, (\alpha_i P_i - \omega_i)/\omega_i \theta_i\}$; $\omega_i = 2^{\rho_i} - 1$;
$Q_i$ is a limit on transmit power of the D2D pair on frequency band of cellular user i;
$\alpha_i$ denotes normalized channel gain from the cellular user i to a base station;
$\theta_i$ denotes normalized channel gain from the D2D transmitter to the base station on frequency band of the cellular user i;
$\rho_i$ is a QoS threshold of the cellular user i; and
$P_i$ is power budget of the cellular user i.

13. The apparatus according to claim 11, wherein optimal transmit power $p_i^*$ of the potential cellular users meet:

$$p_i^* = \frac{\omega_i}{\alpha_i}(1+\theta_i q_i), \omega_i = 2^{\rho_i} - 1$$

wherein $\rho_i$ is a QoS threshold of cellular user i, $\alpha_i$ denotes normalized channel gain from the cellular user i to a base station; $\theta_i$ denotes normalized channel gain from the D2D transmitter to the base station on frequency band of the cellular user i, and $q_i$ is transmit power of the D2D transmitter on the frequency band of the cellular user i.

14. The apparatus according to claim 13, wherein optimal transmit power $q_i^*$ of the D2D pair on frequency band of the potential cellular user i meet:

$$\Sigma_{i=1}^{N} q_i^* = Q$$

wherein Q denotes power budget of the D2D pair.

15. The apparatus according to claim 14, wherein the transmit power determination module is configured to
in a case that a sum of tolerant interference power levels of all potential cellular users contained in the cellular user set is higher than power budget of the D2D pair, determine the transmit power of the D2D pair on the frequency band of the at least one cellular user and the transmit power of the at least one cellular user as $$q_i^* = \left[\frac{\sqrt{B_i^2 - 4A_i C_i(\lambda)} - B_i}{2A_i}\right]_0^{D_i}, \text{ and } p_i^* = \frac{\omega_i}{\alpha_i}(1+\theta_i q_i^*)$$

wherein $[.]_0^{D_i}$ represents the projection onto an interval $[0, D_i]$;

$$A_i = \omega_i \beta_i \theta_i (\alpha_i \gamma_i + \omega_i \beta_i \theta_i);$$

$$B_i = (\alpha_i + \omega_i \beta_i)(2\omega_i \beta_i \theta_i + \alpha_i \gamma_i);$$

$$C_i(\lambda) = (\alpha_i + \omega_i \beta_i)\left(\alpha_i + \omega_i \beta_i - \frac{1}{\lambda}\alpha_i \gamma_i\right);$$

$$D_i = \min\{Q_i, (\alpha_i P_i - \omega_i)/\omega_i \theta_i\};$$

$$\omega_i = 2^{\rho_i} - 1;$$

$\alpha_i$ denotes normalized channel gain from cellular user i to a base station;
$\beta_i$ denotes normalized channel gain from the cellular user i to the D2D receiver;
$\gamma_i$ denotes normalized channel gain from the D2D transmitter to the D2D receiver on frequency band of the cellular user i;
$\theta_i$ denotes normalized channel gain from the D2D transmitter to the base station on frequency band of the cellular user i;
$\rho_i$ is a QoS threshold of the cellular user i;
$\lambda$ is a Lagrange multiplier;
$Q_i$ is a limit on transmit power of the D2D pair on frequency band of the cellular user i; and
$P_i$ is power budget of the cellular user i.

16. The apparatus according to claim 11, wherein the transmit power determination module is configured to determine transmit power of each of the potential cellular users as a fixed value.

17. The apparatus according to claim 16, wherein the fixed power is power budget of each of the potential cellular users, and
wherein the transmit power determination module is configured to determine the transmit power of the D2D pair on frequency band of at least one cellular user as:

$$q_i^* = \left[\mu - \frac{1+\beta_i P_i}{\gamma_i}\right]_0^{D_i}$$

wherein $\mu$ denotes a water level value;
$[.]_0^{D_i}$ represents the projection onto an interval $[0, D_i]$;
$D_i = \min\{Q_i, (\alpha_i P_i - \omega_i)/\omega_i \theta_i\}$ and $\omega_i = 2^{\rho_i} - 1$;
$\alpha_i$ denotes normalized channel gain from cellular user i to a base station;
$\beta_i$ denotes normalized channel gain from the cellular user i to the D2D receiver;
$\gamma_i$ denotes normalized channel gain from the D2D transmitter to the D2D receiver on frequency band of the cellular user i;
$\theta_i$ denotes normalized channel gain from the D2D transmitter to the base station on frequency band of the cellular user i;
$P_i$ is power budget of the cellular user i;
$\rho_i$ is a QoS threshold of the cellular user i; and
$Q_i$ is a limit on transmit power of the D2D pair on frequency band of the cellular user i.

18. The apparatus according to claim 11, wherein a fixed number of cellular users are selected from the cellular user set for resource sharing with the D2D pair, and
wherein the fixed number is one.

19. The apparatus according to claim 18, wherein the transmit power determination module is configured to determine the transmit power q* of the D2D pair on frequency band of cellular user n which is selected for resource sharing with the D2D pair and the transmit power p* of the cellular user n as:

$$q^* = D_n, \, p^* = \frac{\omega_n}{\alpha_n}(1 + \theta_n D_n),$$

wherein, $$n = \underset{i}{\mathrm{argmax}} S_i, \, S_i = \log\left(1 + \frac{\alpha_i \gamma_i D_i}{\alpha_i + \omega_i \beta_i + \omega_i \beta_i \theta_i D_i}\right),$$

$D_i = \min\{Q, (\alpha_i P_i - \omega_i)/\omega_i \theta_i\}$ and $\omega_i = 2^{\rho_i} - 1$, wherein $\alpha_i$ denotes normalized channel gain from cellular user i to a base station;

$\beta_i$ denotes normalized channel gain from the cellular user i to the D2D receiver;

$\gamma_i$ denotes normalized channel gain from the D2D transmitter to the D2D receiver on frequency band of the cellular user i;

$\theta_i$ denotes normalized channel gain from the D2D transmitter to the base station on frequency band of the cellular user i;

$q_i$ denotes transmit power of the D2D pair on frequency band of the cellular user i;

$\rho_i$ is a QoS threshold of the cellular user i;

Q denotes power budget of the D2D pair; and $P_i$ is power budget of the cellular user i.

20. The apparatus according to claim 11, wherein the apparatus is configured to re-operate in response to expiring of a scheduling period.

\* \* \* \* \*